(12) United States Patent
Parker et al.

(10) Patent No.: US 7,446,427 B2
(45) Date of Patent: Nov. 4, 2008

(54) REARVIEW MIRROR SYSTEM FOR ACCOMMODATING A RAIN SENSOR

(75) Inventors: Brian R. Parker, Zeeland, MI (US);
Brian J. Rees, Holland, MI (US);
Wayne J. Rumsey, Holland, MI (US);
Timothy S. DeVries, Jenison, MI (US);
John W. Carter, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 883 days.

(21) Appl. No.: 10/848,803

(22) Filed: May 19, 2004

(65) Prior Publication Data
US 2004/0232773 A1 Nov. 25, 2004

Related U.S. Application Data

(60) Provisional application No. 60/472,017, filed on May 20, 2003.

(51) Int. Cl.
*H02G 3/00* (2006.01)

(52) U.S. Cl. .............. 307/10.1; 73/170.17; 250/208.1; 250/239; 250/341.7; 250/438; 362/494; 340/438; 340/815.4

(58) Field of Classification Search .............. 73/170.17; 250/208.1, 239, 341.7, 438, 815.4; 362/494; 340/438, 815.4
See application file for complete search history.

(56) References Cited

U.S. PATENT DOCUMENTS

| | | | |
|---|---|---|---|
| 4,859,867 A * | 8/1989 | Larson et al. ............... | 307/10.1 |
| 4,871,917 A * | 10/1989 | O'Farrell et al. .......... | 250/341.7 |
| 4,916,374 A | 4/1990 | Schierbeek et al. | |
| 4,930,742 A | 6/1990 | Schofield et al. | |
| 4,936,533 A | 6/1990 | Adams et al. | |
| 4,956,591 A * | 9/1990 | Schierbeek et al. .......... | 318/483 |
| 4,973,844 A * | 11/1990 | O'Farrell et al. ......... | 250/341.7 |
| 5,058,851 A | 10/1991 | Lawlor et al. | |
| 5,100,095 A | 3/1992 | Haan et al. | |
| 5,266,873 A * | 11/1993 | Arditi et al. ................ | 318/483 |
| 5,475,366 A | 12/1995 | Van Lente et al. | |

(Continued)

FOREIGN PATENT DOCUMENTS

DE 42 14 223 A1 11/1993

(Continued)

OTHER PUBLICATIONS

Japanese Abstract for Document No. 59-029539.

*Primary Examiner*—Thomas G. Black
*Assistant Examiner*—Wae Louie
(74) *Attorney, Agent, or Firm*—Price, Heneveld, Cooper, DeWitt & Litton, LLP

(57) ABSTRACT

A visual, rear viewing and rain sensing system for a vehicle comprising a windshield and a button connected to the windshield, with the button having a peripheral body defining an open area in a middle section of the button. The visual, rear viewing and rain sensing system further includes a rain sensor located in the middle section and an interior rearview mirror system connected to the button. The rain sensor is operatively coupled to the windshield independent of the interior rearview mirror system. At least a portion of the rain sensor is no longer operatively coupled to the windshield as the interior rearview mirror system is detached from the button.

48 Claims, 15 Drawing Sheets

U.S. PATENT DOCUMENTS

| | | | |
|---|---|---|---|
| 5,487,522 | A | 1/1996 | Hook |
| 5,572,354 | A | 11/1996 | Desmond et al. |
| 5,576,687 | A | 11/1996 | Blank et al. |
| 5,615,857 | A | 4/1997 | Hook |
| 5,708,410 | A | 1/1998 | Blank et al. |
| 5,710,633 | A | 1/1998 | Klappenbach et al. |
| 5,796,094 | A | 8/1998 | Schofield et al. |
| 5,820,097 | A | 10/1998 | Spooner |
| 5,923,027 | A * | 7/1999 | Stam et al. ............... 250/208.1 |
| 6,020,704 | A * | 2/2000 | Buschur .................... 318/483 |
| 6,097,024 | A * | 8/2000 | Stam et al. ............... 250/208.1 |
| 6,158,655 | A | 12/2000 | DeVries, Jr. et al. |
| 6,172,613 | B1 * | 1/2001 | DeLine et al. ........... 340/815.4 |
| 6,198,409 | B1 | 3/2001 | Schofield et al. |
| 6,222,460 | B1 * | 4/2001 | DeLine et al. ........... 340/815.4 |
| 6,243,003 | B1 | 6/2001 | DeLine et al. |
| 6,250,148 | B1 * | 6/2001 | Lynam .................... 73/170.17 |
| 6,299,319 | B1 * | 10/2001 | Mertens et al. ............. 359/871 |
| 6,313,454 | B1 * | 11/2001 | Bos et al. ................. 250/208.1 |
| 6,326,613 | B1 | 12/2001 | Heslin et al. |
| 6,341,523 | B2 * | 1/2002 | Lynam .................... 73/170.17 |
| 6,353,392 | B1 * | 3/2002 | Schofield et al. ............. 340/602 |
| 6,832,719 | B2 * | 12/2004 | DeVries et al. .............. 235/380 |
| 6,877,870 | B2 * | 4/2005 | Krug ........................ 359/871 |
| 6,968,736 | B2 * | 11/2005 | Lynam .................... 73/170.17 |
| 7,265,342 | B2 * | 9/2007 | Heslin et al. ............... 250/239 |
| 2001/0018847 | A1 * | 9/2001 | Lynam .................... 73/170.17 |
| 2004/0200948 | A1 * | 10/2004 | Bos et al. ................. 250/208.1 |
| 2004/0232773 | A1 * | 11/2004 | Parker et al. ............... 307/10.1 |

FOREIGN PATENT DOCUMENTS

| | | |
|---|---|---|
| DE | 43 29 983 A1 | 3/1995 |
| DE | 298 05 142 U1 | 5/1998 |
| DE | 197 55 008 A1 | 7/1999 |
| EP | 0 461 424 B1 | 9/1994 |
| EP | 0 667 254 A1 | 8/1995 |
| EP | 0 928 723 A2 | 7/1999 |
| WO | WO 98/14974 | 4/1998 |
| WO | WO 98/30415 | 7/1998 |
| WO | WO 99/14088 | 3/1999 |
| WO | WO 99/23828 | 5/1999 |

* cited by examiner

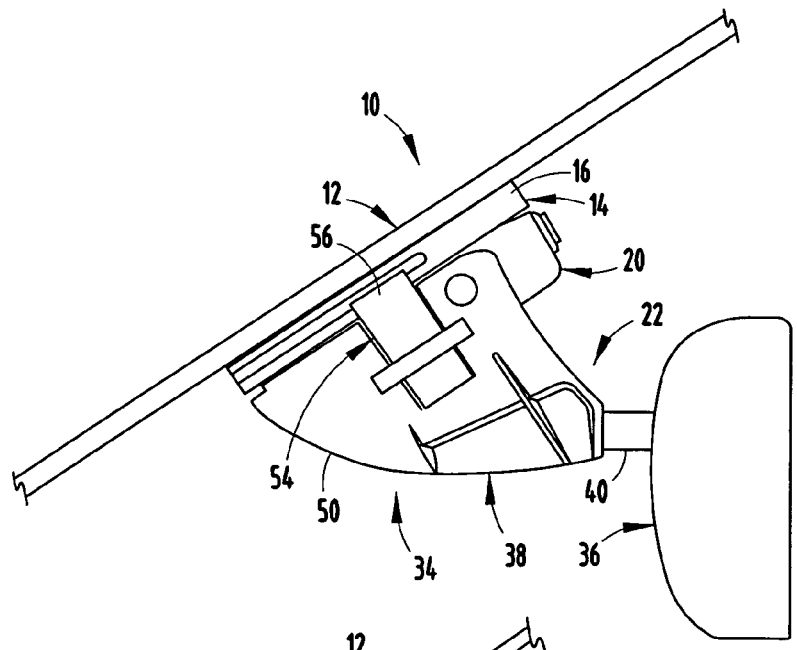
FIG. 1
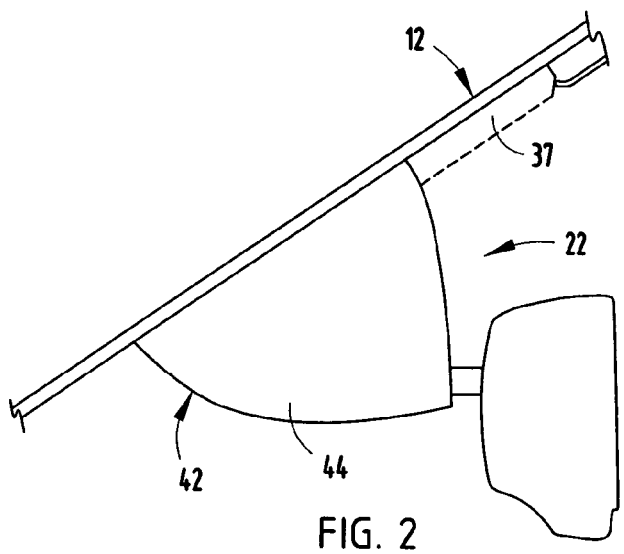
FIG. 2
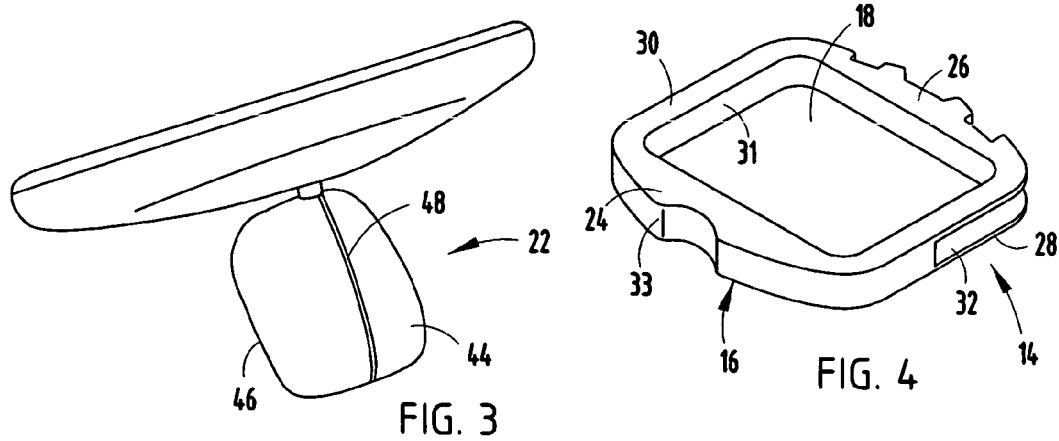
FIG. 3
FIG. 4

REARVIEW MIRROR SYSTEM FOR ACCOMMODATING A RAIN SENSOR

CROSS-REFERENCE TO RELATED APPLICATION

This application claims the benefit of U.S. Provisional Application No. 60/472,017, filed May 20, 2003.

BACKGROUND OF THE INVENTION

The present invention relates to a system for automatically detecting the presence of moisture on a surface, such as the surface of a windshield of a vehicle for an automobile, in order to automatically actuate the vehicle's windshield wipers and/or defroster or defogging system and to safely detach the moisture detectors system as a interior rearview mirror system is detached from the windshield.

In conventional windshield wiper systems, the windshield wipers are actuated based on the elapsed time between wipes rather than the moisture level on the exterior of the windshield.

During conditions of relatively consistent rainfall, for example, the time interval can be adjusted to correspond to the amount of time in which the rain accumulates to the point of the desired visibility level. Unfortunately, the rate of rainfall may vary dramatically over a given period of time. Additionally, traffic conditions may also cause varying amounts of rain to fall on the windshields, such as when a truck passes by. As a result, during such conditions, the driver must frequently adjust the wiper time interval, which can be cumbersome.

Various systems are known which automatically control the interval between wipes of the windshield wipers based upon moisture on the vehicle windshield. In some known systems, various coatings are applied to the vehicle windshield. Electrical measurement of those coatings is used to provide an indication of the moisture content on the windshield. Unfortunately, such methods require relatively expensive processes, which makes such systems commercially non-viable. Other systems for automatically sensing the moisture content on a vehicle windshield are also known. For example, optical systems are known which measure the difference of reflected light of a dry windshield versus a wet windshield. Other known systems must be adhered to the windshield, which complicates the windshield replacement. As a result of such complications, moisture sensors are rarely found on vehicles.

Commonly assigned U.S. Pat. Nos. 5,923,027; 6,097,024; 6,262,410; 6,495,815 and 6,681,163, the entire contents of which are hereby incorporated herein by reference also disclose moisture sensing systems. However, any moisture sensing system must be able to be safely used to prevent injury during vehicle impacts and must pass safety regulations.

SUMMARY OF THE INVENTION

One aspect of the present invention is to provide an interior rear viewing and sensing system for a vehicle having a windshield and a button connected thereto. The interior viewing and sensing system includes a sensor and an interior rearview mirror system. The sensor is configured to be operatively coupled to the windshield and be located adjacent the button. The interior rearview mirror system is configured to be connected to the button and to cover the sensor. The sensor is configured to be operatively coupled to the windshield independent of the interior rearview mirror system. At least a portion of the sensor is no longer operatively coupled to the windshield as the interior rearview mirror system is detached from the button.

In yet another aspect of the present invention, a viewing system for a vehicle having a windshield, a button connected thereto and a sensor being retained against the windshield by a retainer is provided. The viewing system comprises an interior rearview mirror system configured to be connected to the button and be located adjacent the sensor. The interior rearview mirror system includes a mechanism configured to engage the retainer. The interior rearview mirror system does not bias the sensor against the windshield when the interior rearview mirror is connected to the button. Rather, the mechanism is configured to engage the retainer as the interior rearview mirror system is detached from the button to thereby pull the retainer away from the sensor, thereby allowing the sensor to fall from the windshield.

Another aspect of the present invention is to provide a viewing system for a vehicle having a windshield, a button and a sensor be-mg operatively coupled to the windshield. The viewing system comprises an interior rearview mirror system configured to be connected to the button and be located adjacent the sensor, with the interior rearview mirror system including a mechanism-configured to engage the sensor. The interior rearview mirror system does not bias the sensor against the windshield when the interior rearview mirror is connected to the button. The mechanism is configured to engage at least a portion of the sensor as the interior rearview mirror system is detached from the button to thereby pull the at least a portion of the sensor away from the windshield.

These and other features, advantages, and objects of the present invention will be further understood and appreciated by those skilled in the art by reference to the following specification, claims and appended drawings.

BRIEF DESCRIPTION OF THE DRAWINGS

FIG. 1 is a side view of a visual, rear viewing and rain sensing system for a vehicle embodying the present invention with a mounting bracket cover of an interior rearview mirror system removed.

FIG. 2 is a side view of the visual, rear viewing and rain sensing system for a vehicle embodying the present invention with the mounting bracket cover of the interior rearview mirror system.

FIG. 3 is a bottom perspective view of the interior rearview mirror system.

FIG. 4 is a top perspective view of a button.

DETAILED DESCRIPTION OF THE PREFERRED EMBODIMENTS

Figure 5A:
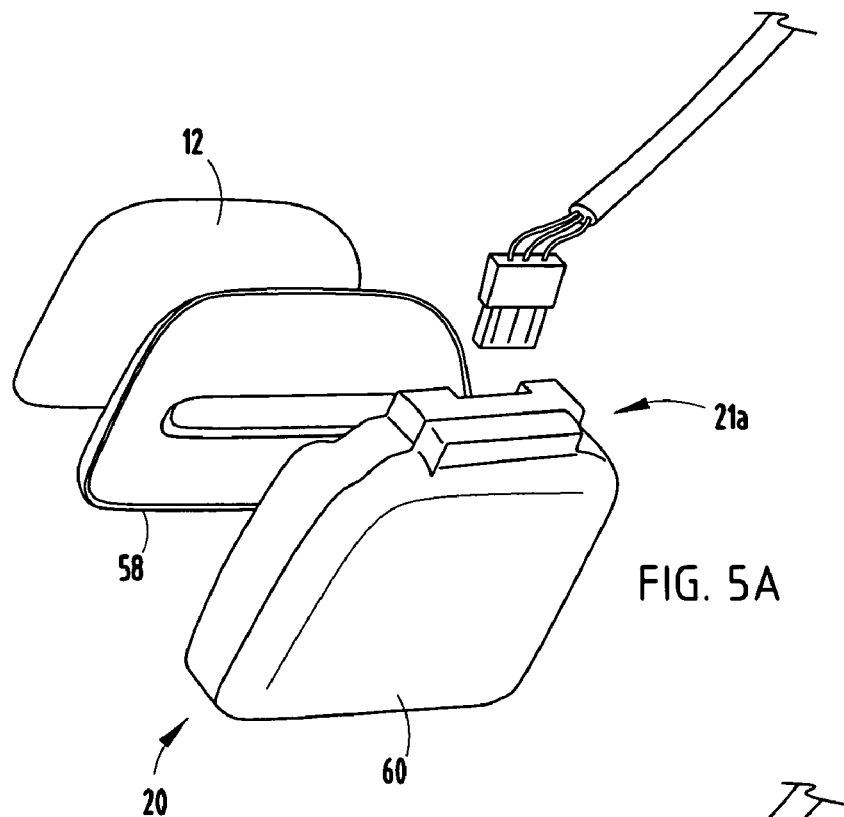
FIG. 5A is a perspective view of a double body rain sensor of the present invention.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The reference number 10 (FIGS. 1-3) generally designates a visual, rear viewing and rain sensing system for a vehicle embodying the present invention. In the illustrated example, the visual, rear viewing and rain sensing system 10 comprises a button 14 configured to be connected to a windshield 12, with the button 14 having a peripheral body 16 defining an open area 18 in a middle section of the button 14. The visual, rear viewing and rain sensing system 10 further includes a rain sensor 20 located in the middle section and an interior rearview mirror system 22 connected to the button 14. The rain sensor 20 is configured to be operatively coupled to the windshield 12 independent of the interior rearview mirror system 22. At least a portion of the rain sensor 20 is no longer operatively coupled to the windshield 12 as the interior rearview mirror system 22 is detached from the button 14.

The illustrated button 14 (FIG. 4) connects the interior rearview mirror system 22 to the windshield 12. The button 14 is preferably autoclaved to the windshield 12 in a manner known to those skilled in the art. However, it is contemplated that the button 14 could be connected to the windshield 12 in other manners. For example, the button 14 could be connected to the windshield 12 by an adhesive such as an epoxy, a polyvinyl butyral, a urethane, or a silicone adhesive material or the like. In the illustrated example, the peripheral body 16 of the button 14 has a generally rectangular shape, although it is contemplated that the peripheral body 16 could have any geometric shape. Furthermore, although the peripheral body 16 is illustrated as having a closed periphery, it is contemplated that the peripheral body 16 could have breaks in the periphery. The peripheral body 16 includes an upper segment 24, a lower segment 26, a first side segment 28 connecting the upper segment 24 and the lower segment 26, and a second side segment 30 also connecting the upper segment 24 and the lower segment 26. The upper segment 24, the lower segment 26, the first side segment 28 and the second side segment 30 delineate an inner circumference 31 defining the open area 18 in the middle section of the button 14 and an outer circumference 33. A cross section of each of the upper segment 24, the lower segment 26, the first side segment 28 and the second side segment 30 is illustrated as being substantially rectangular, although it is contemplated that other geometric shapes could be used. The first side segment 28 and the second side segment 30 each include a groove 32 on an outer face thereof about 2/3 of the way between the lower segment 26 and the upper segment 24. As explained in more detail below, the interior rearview mirror system 22 slides into the grooves 32 to connect the interior rearview mirror system 22 to the button 14. Furthermore, the button 14 preferably includes a detent (not shown) that maintains the interior rearview mirror system 22 connected to the button 14 such that the interior rearview mirror system 22 cannot slide off the grooves 32 in the same manner in which the interior rearview mirror system 22 is slid onto the button 14.

In the illustrated example, the rain sensor 20 (FIGS. 5A and 5B) preferably uses optical sensing to determine the amount and/or intensity of precipitation on the windshield 12 and activates and/or selects a speed for the windshield wipers of the vehicle. However, it is contemplated that the rain sensor 20 could use other methods of determining the amount and/or intensity of precipitation on the windshield 12 (e.g., capacitance, resistance, etc.). The method of using the rain sensor 20 to determine the amount and/or intensity of precipitation on the windshield 12 is well known to those skilled in the art. Examples of rain sensors include those commercially available from TRW Automotive located in Farmington Hills, Mich., under the part numbers 7803, 7230, 7992 and 7812. A further example of a rain sensor is disclosed in U.S. Pat. No. 6,433,501 entitled "SENSOR DEVICE FOR DETECTING MOISTURE ON A WINDOW," the entire contents of which are hereby incorporated herein by reference. Those skilled in the art will appreciate that other similarly functioning rain sensors 20 may be used. It is contemplated that instead of a rain sensor 20, any sensor could be used. For example, the sensor could be a humidity sensor, a sky sensor, a headlamp recognition sensor, GPS, a road toll passing sensor, etc. Therefore, as rain sensor 20 as used herein could also be used for any sensor.

Figure 5B:
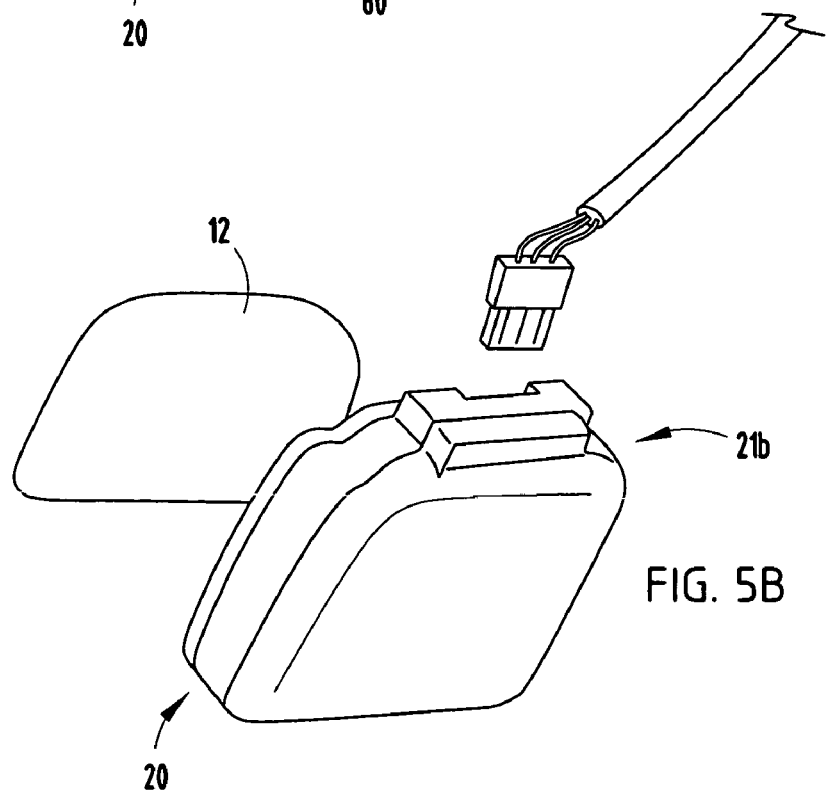
FIG. 5B is a perspective view of a single body rain sensor of the present invention.
Figure 5C:
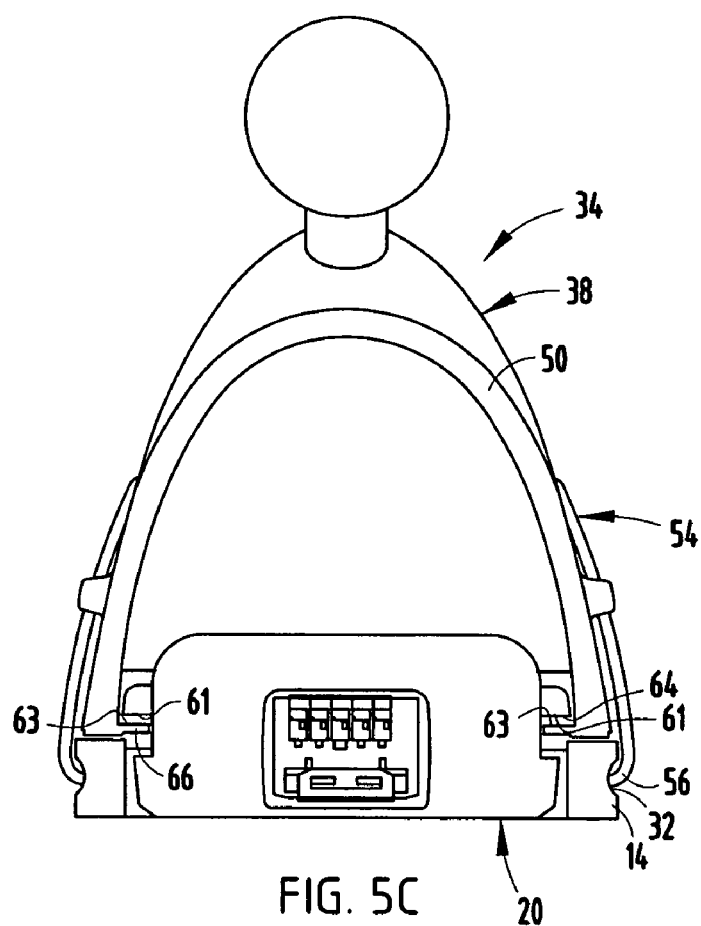
FIG. 5C is a first partial cross-sectional end view of a mounting bracket of the interior rearview mirror system, the button and the rain sensor of a first embodiment of the present invention.
Figure 6:
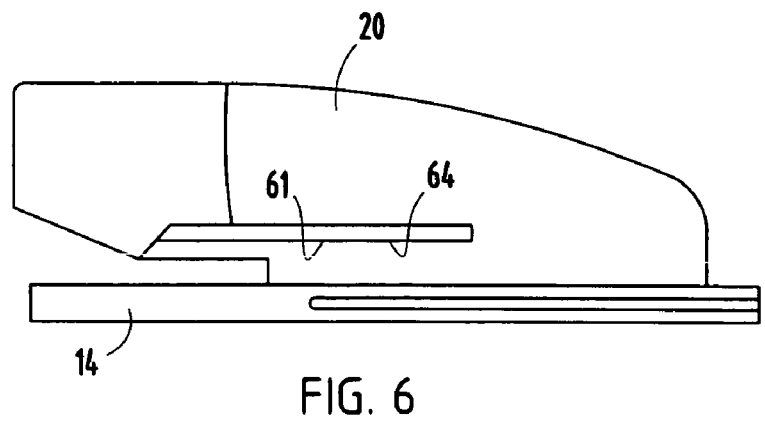
FIG. 6 is a side view of the button and the rain sensor of the first embodiment of the present invention.
Figure 7:
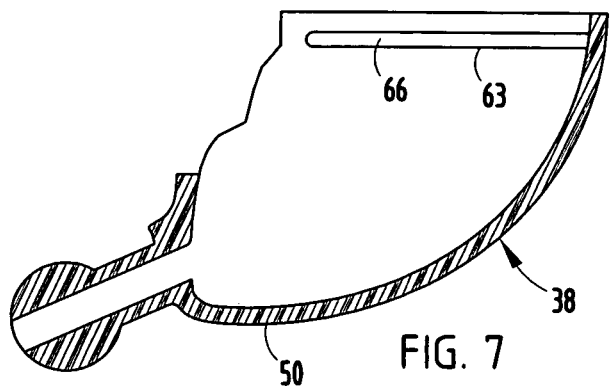
FIG. 7 is a cross-sectional view of the mounting bracket of the interior rearview mirror system of the first embodiment of the present invention.
Figure 8:
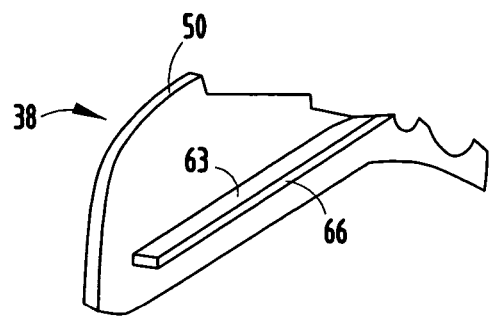
FIG. 8 is a partial perspective view of the mounting foot of the interior rearview mirror system of the first embodiment of the present invention.
Figure 9:
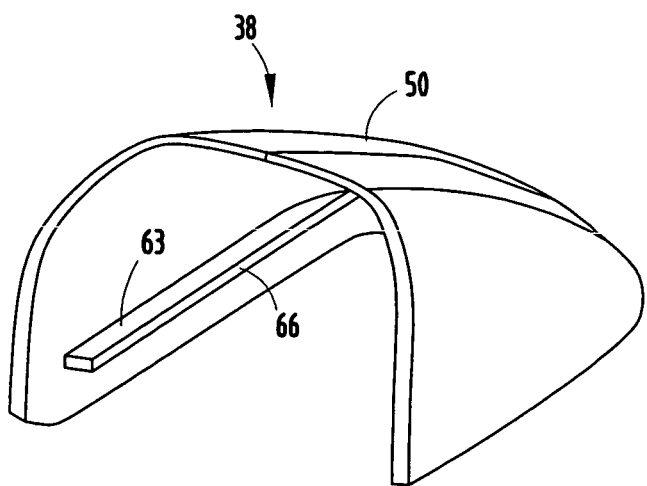
FIG. 9 is a perspective view of the mounting foot of the interior rearview mirror system of the first embodiment of the present invention.
Figure 10:
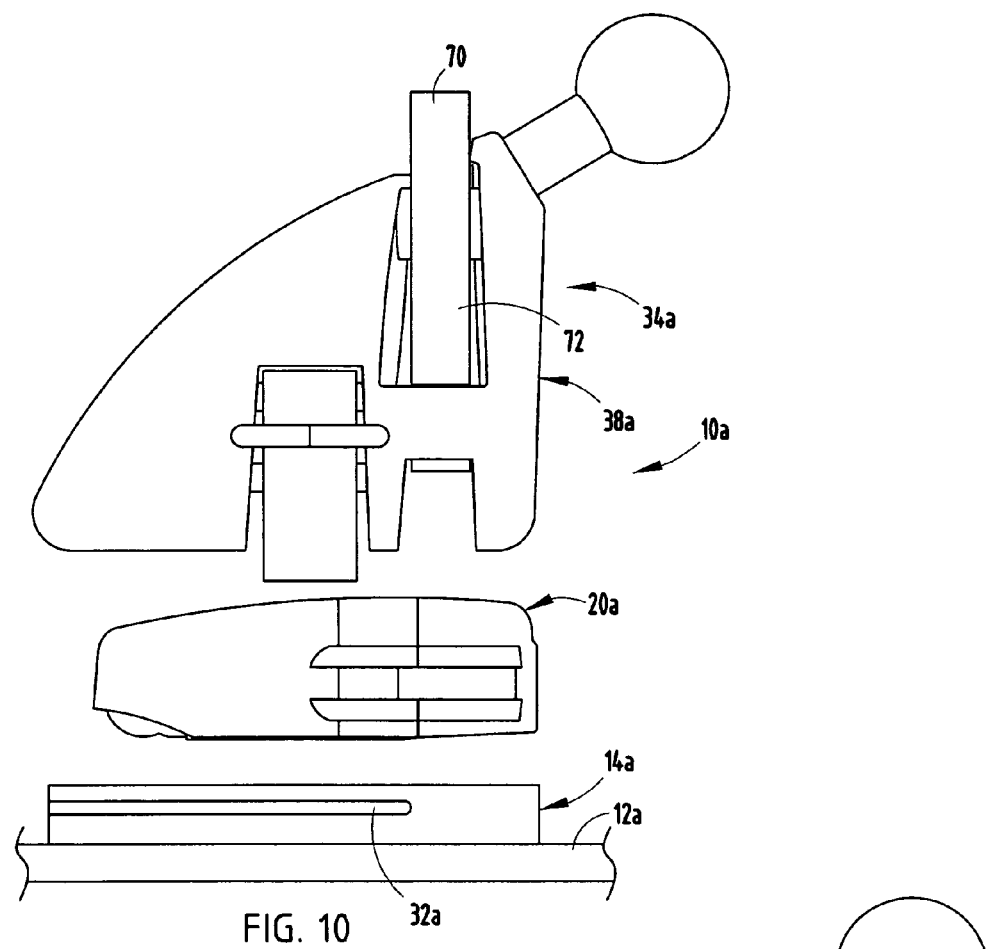
FIG. 10 is an exploded side view of the mounting bracket of the interior rearview mirror system, the button and the rain sensor of a second embodiment of the present invention.
Figure 11:
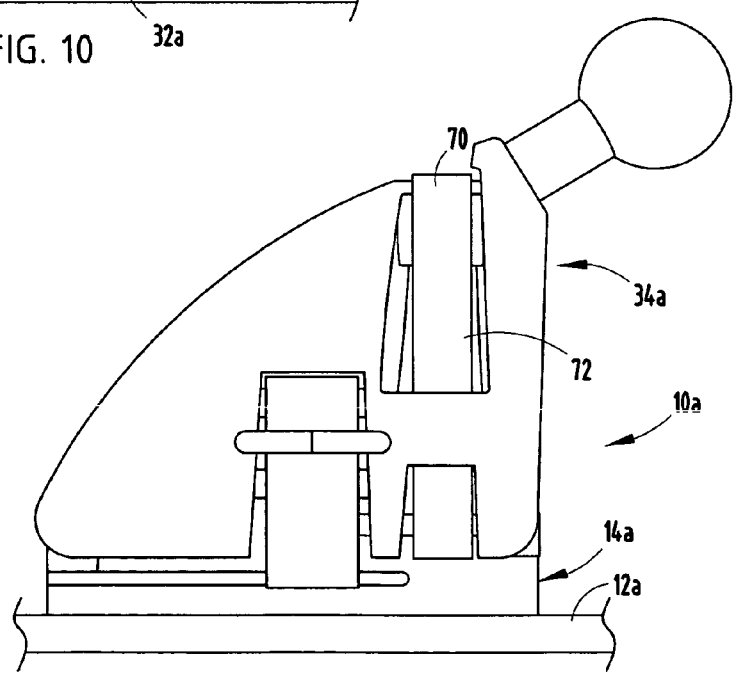
FIG. 11 is a side view of the mounting bracket of the interior rearview mirror system, the button and the rain sensor of the second embodiment of the present invention.
Figure 12A:
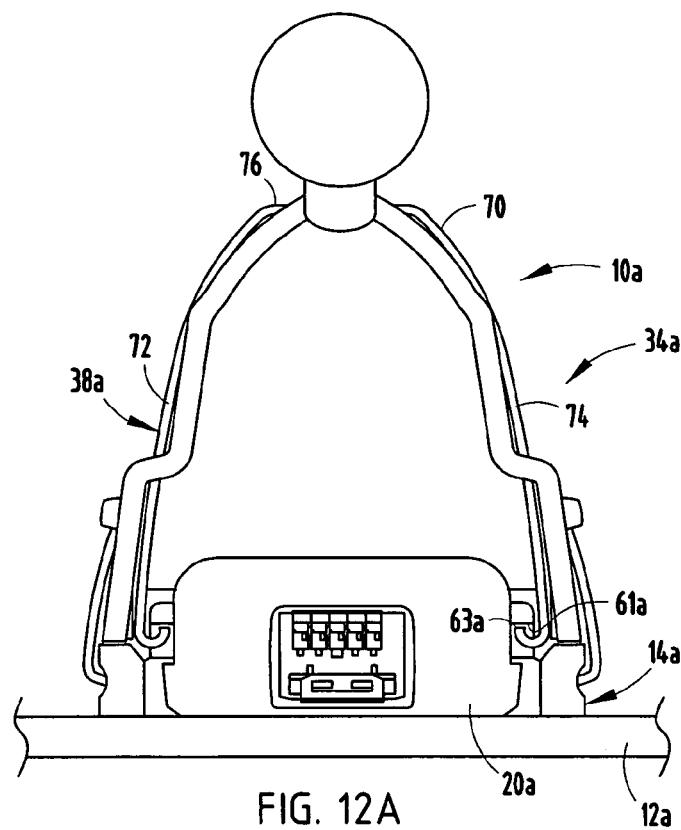
FIG. 12A is a first partial cross-sectional end view of the mounting bracket of the interior rearview mirror system, the button and the rain sensor of the second embodiment of the present invention.
Figure 12B:
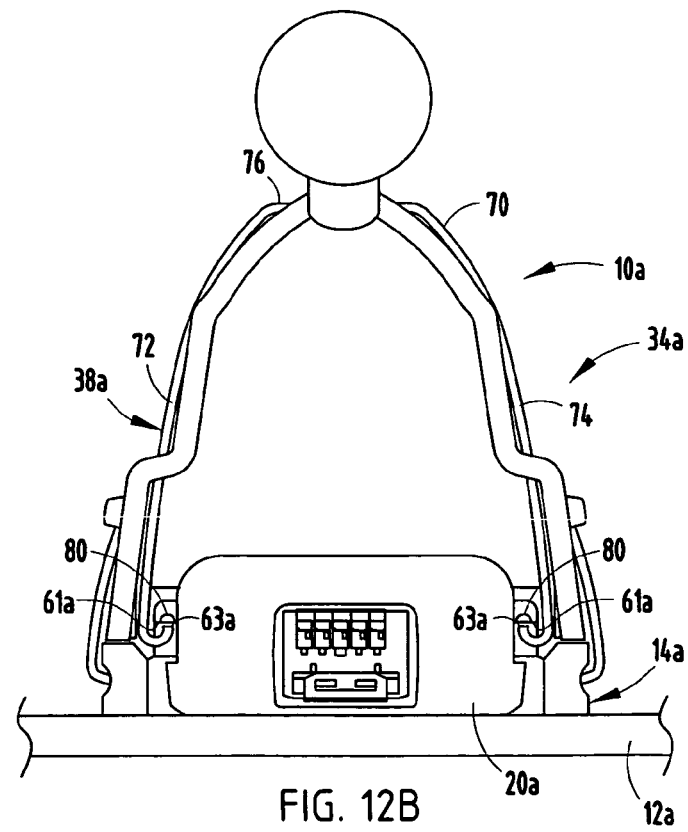
FIG. 12B is a second partial cross-sectional end view of the mounting bracket of the interior rearview mirror system, the button and the rain sensor of the second embodiment of the present invention.
Figure 13:
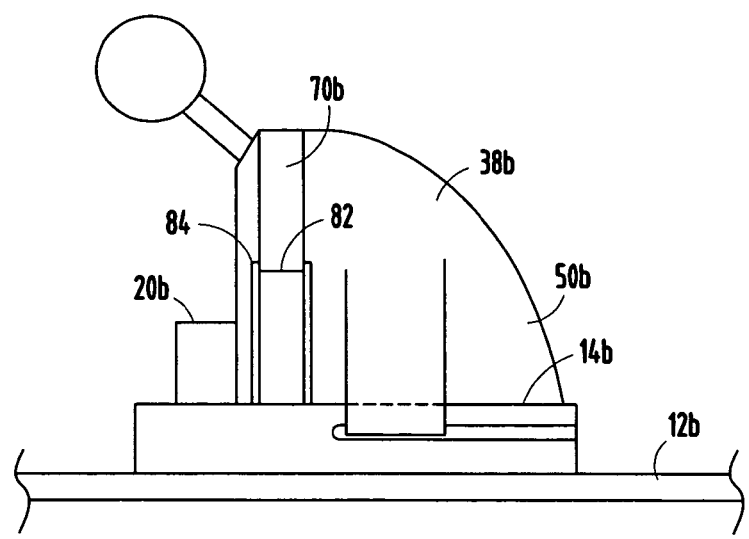
FIG. 13 is side view of the mounting bracket of the interior rearview mirror system, the button and the rain sensor of a third embodiment of the present invention.
Figure 14:
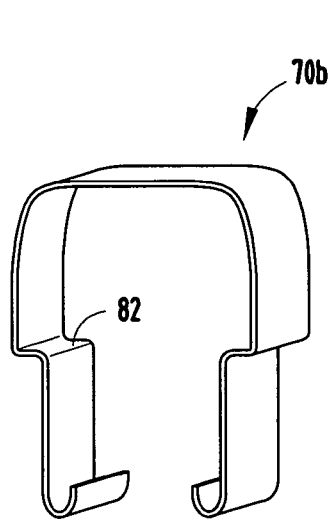
FIG. 14 is a perspective view of a spring clip of the third embodiment of the present invention.

The illustrated rain sensor 20 can include a double body 21*a* (FIG. 5A) or a single body 21*b* (FIG. 5B). The single body 21*b* is an integral single body that is operatively coupled to the windshield 12. The rain sensor 20 with the double body 21*a* has a first section 58 and a second section 60 removably connected to the first section 58. The first section 58 is connected to the windshield 12 and may stay connected to the windshield 12 as the interior rearview mirror system 22 is detached from the button 14. However, the second section 60 preferably disconnects from the first section 58 as the interior rearview mirror system 22 is detached from the button 14. Preferably, the first section 58 does not extend further than 10 mm from the windshield 12. The rain sensor 20 with the single body 21*b* or the double body 21*a* is illustrated as being located in the open area 18 in a middle section of the button 14. As used herein, the term rain sensor 20 includes the single body 21*b*, the double body 21*a* or any number of body parts forming the rain sensor 20. Furthermore, it is contemplated that, while the sensor(s) of the rain sensor 20 are located in the single body 21*b*, the double body 21*a* or any number of body parts forming the rain sensor 20, the electronics of the rain sensor 20 could be located in the single body 21*b*, the double body 21*a*, any number of body parts forming the rain sensor 20, or in another part of the vehicle. For example, the electronics of the rain sensor 20 could be located in the interior rearview mirror system 22.

In the illustrated example, the rain sensor 20 is operatively coupled to the windshield 12 independent of the interior rearview mirror system 22. The rain sensor 20 can be operatively coupled to the windshield 12 by having the rain sensor 20 adhered to the windshield by an adhesive such as an epoxy, a polyvinyl butyral, a urethane, or a silicone adhesive material or the like. It is contemplated that the rain sensor 20 could be adhered to the windshield 12 by other means. In addition to the adhesive, or as an alternative to the adhesive, the rain sensor 20 could be operatively coupled to the windshield by being held against the windshield 12 or by being pressed against the windshield 12 such that the rain sensor 12 would be able to determine the amount and/or intensity of precipitation on the windshield 12 and activate and/or select a speed for the windshield wipers of the vehicle. Moreover, it is contemplated that the rain sensor 20 could be operatively coupled to the windshield 12 by being held spaced from and adjacent to the windshield 12 in a fixed position such that the rain sensor 20 would be able to determine the amount and/or intensity of precipitation on the windshield 12 and activate and/or select a speed for the windshield wipers of the vehicle. One manner of being operatively coupled to the windshield 12 includes being optically coupled to the windshield 12. When the rain sensor 20 uses an optical sensor to determine the amount and/or intensity of precipitation on the windshield 12, the rain sensor 20 is considered to be optically coupled to the windshield 12.

As the interior rearview mirror system 22 is detached from the button 14, the rain sensor 20 is no longer operatively coupled to the windshield 12. Examples of when the rain sensor 20 having the single body 21*b* is no longer operatively coupled to the windshield 12 include when the single body 21*b* is no longer adhered to the windshield 12, when the single body 21*b* is no longer being held against the windshield 12, when the single body 21*b* is no longer being pressed against the windshield 12 or when the single body 21*b* is no longer being held spaced from and adjacent to the windshield 12 in the fixed position. Examples of when the rain sensor 20 having the double body 21*a* is no longer operatively coupled to the windshield 12 include when the second section 60 of the rain sensor 20 is detached from the first section 58 or when the first section 58, and thereby the second section 60, is no longer connected or adhered to the windshield 12. Preferably, the single body 21*b* of the rain sensor 20 is operatively coupled to the windshield 12 such that a force no greater than 400 N (90 pounds) can operatively disconnect the rain sensor 20 with the single body 21*b* from the windshield 12. Likewise, with the rain sensor 20 having the double body 21*a*, the second section 60 is preferably connected to the first section 58 such that a force no greater than 400 N (90 pounds) can separate the second section 60 from the first section 58 of the rain sensor 20.

Referring to FIG. 1, the illustrated interior rearview mirror system 22 is connected to the button 14 and provides a driver of the vehicle with a field of view to the rear of the vehicle. The interior rearview mirror system 22 comprises a mounting bracket 34 and a mirror housing 36. The mirror housing 36 preferably includes a variable reflectance mirror such as an electrochromic mirror or may include a prismatic mirror located therein. The mirror provides the driver of the vehicle with the view to the rear of the vehicle. The variable reflectance mirror and the prismatic mirror are well known to those skilled in the art. The mirror housing 36 and/or the mounting bracket 34 could also include other electronic components as is well known to those skilled in the art. Furthermore, the interior rearview mirror system 22 could include a wire cover 37 (shown in phantom in FIG. 2) integral with or attached to either or both of the mounting bracket 34 or a mounting bracket cover 42. The wire cover 37 preferably covers wiring and/or cables extending from the interior rearview mirror system 22 and/or the rain sensor 20 to a headliner of the vehicle. The interior rear view mirror system 22 and the components thereof could include the wiring schemes and/or mounting features of the interior rearview mirror systems 22 described in commonly assigned U.S. Pat. Nos. 5,984,482; 6,068,380; 5,971,553; 6,467,919; and 7,287,868, U.S. patent application Publication Ser. No. 2005/0195486 and U.S. patent application Ser. No. 60/467,888, the disclosures of which are incorporated in their entireties herein by reference.

In the illustrated example, the mounting bracket 34 includes a mounting foot 38 connected to the button 14. The mounting bracket 34 preferably has a single ball or a double ball for positioning the mirror housing 36. The mounting bracket 34 preferably includes the mounting foot 38 and an arm 40 with a ball on the end thereof extending from the mounting foot 38. If the mounting bracket 34 includes the single ball, the ball on the end of the arm 40 extends into a socket in the mirror housing 36, thereby allowing the mirror housing 36 to rotate about the ball. If the mounting bracket 34 includes the double ball (not shown), the ball on the end of the arm 40 extends into a socket in a stem. Furthermore, with the double ball, the mirror housing 36 would include a second ball that extends into another socket in the stem, thereby allowing the stem to rotate about the ball on the arm 40 and allowing the mirror housing 36 to rotate relative to the stem about the second ball. The mounting bracket 34 including the single ball or the double ball is well known to those skilled in the art. It is further contemplated that the interior rearview mirror system 22 could include an integral mounting bracket 34 and mirror housing 36.

The illustrated interior rearview mirror system 22 further preferably includes a mounting bracket cover 42 (FIGS. 2 and 3) enclosing the mounting foot 38. The mounting bracket cover 42 preferably includes a first cover portion 44 and a second cover portion 46 that surround the mounting foot 38. Each of the first cover portion 44 and second cover portion 46 also include a semi-circular section that wraps about the arm 40 to allow the arm 40 to extend out of the mounting bracket cover 42. The first cover portion 44 could fit over an upper portion of the mounting foot 38 and the second cover portion 46 could fit over a lower portion of the mounting foot 38, thereby providing a substantially horizontal connection. Alternatively, first cover portion 44 could fit over a first side portion of the mounting foot 38 and the second cover portion 46 could fit over a second side portion of the mounting foot 38, thereby providing a substantially vertical connection 48.

The interior rearview mirror system 22 is connected to the button 14 and preferably deflects, collapses or breaks away from the button 14 when a reflective surface of the mirror of the mirror housing 36 is subjected to a force no greater than 400 N (90 pounds) in any direction that is not more than 45° from a forward longitudinal direction of motion of the vehicle. The mounting foot 38 of the interior rearview mirror system 22 comprises a shell 50 covering the button 14. In the illustrated example, the shell 50 includes three sides covering a portion of at least three of the upper segment 24, the lower segment 26, the first side segment 28 and the second side segment 30 of the button 14. The mounting foot 38 further includes a mount spring 54 comprising a pair of J-shaped hooks 56 that extend lower than a bottom of the shell 50.

In the illustrated example, the interior rearview mirror system 22 is connected to the button 14 by sliding ends of the pair of J-shaped hooks 56 into the grooves 32 on the outer faces of the first side segment 28 and the second side segment 30 of the button 14. The mounting bracket cover 42 is then fixed into position over the mounting foot 38 of the interior rearview mirror system 22 and the button 14. The pair of J-shaped hooks 56 preferably snap over detents (not shown) such that the J-shaped hooks 56, and therefore the mounting foot 38, cannot slide out of contact with the grooves 32 of the button 14 in the same manner in which the J-shaped hooks 56 are slid into the grooves 32 as the interior rearview mirror system 22 disconnects from the button 14. Preferably, the pair of J-shaped hooks 56 deflect outwardly out of the grooves 32 and thereby disconnect the interior rearview mirror system 22 from the button 14 when the reflective surface of the mirror of the mirror housing 36 is subjected to a force no greater than 400 N (90 pounds) in any direction that is not more than 45° from a forward longitudinal direction of motion of the vehicle.

FIGS. 5C-9 illustrate a first embodiment of the present invention wherein at least a portion of the rain sensor 20 is no longer operatively coupled to the windshield 12 as the interior rearview mirror system 22 detaches from the button 14. In the illustrated first embodiment of the present invention, the rain sensor 20 includes at least one ledge 61 and the interior rearview mirror system 22 includes at least one ledge 63 that faces the at least one ledge 61 of the rain sensor 20, and the at least one ledge 63 of the interior rearview mirror system 22 is adapted to engage the at least one ledge 61 of the rain sensor 20 as the interior rearview mirror system 22 detaches from the button 14. In the illustrated example, the rain sensor 20 includes two ledges 61 and the interior rearview mirror system 22 includes two ledges 63. Therefore, the ledges 63 of the interior rearview mirror system 22 engage the ledges 61 of the rain sensor 20 as the interior rearview mirror system 22 detaches from the button 14, whereby at least a portion of the rain sensor 20 (e.g., the entire single body 21b of the single body rain sensor 20 or the second section 60 of the rain sensor 20 with the double body 21a) is no longer operatively coupled to the windshield 12 as the interior rearview mirror system 22 is disconnected from the button 14. In the illustrated example, the ledges 61 of the rain sensor 20 have a pair of parallel sensor surfaces 64 substantially parallel with the grooves 32 on the outer faces of the first side segment 28 and the second side segment 30 of the button 14. When the rain sensor 20 with the double body 21a is used in the first embodiment of the present invention, the pair of parallel sensor surfaces 64 are located on the second section 60 of the rain sensor 20. Preferably, the pair of parallel sensor surfaces 64 are co-planar. The illustrated interior rearview mirror system 22 includes a pair of ribs 66 extending from the inside surfaces of two opposite sides of the shell 50 of the mounting foot 38. The ribs 66 of the interior rearview mirror system 22 include the ledges 63 that face the ledges 61 of the rain sensor 20. The rain sensor 20 having the ledges 61 is a modification of the housings of the commercially available rain sensors as disclosed herein.

In the illustrated example, the interior rearview mirror system 22 of the first embodiment of the present invention is connected to the button 14 by sliding the mounting foot 38 onto the button 14 as described above. Furthermore, the ribs 66 of the interior rearview mirror system 22 slide below the ledges 61 of the rain sensor 20 to thereby position the ribs 66 and the ledges 63 of the interior rearview mirror system 22 between the windshield 12 and the ledges 61 of the rain sensor 20. Thereafter, the mounting bracket cover 42 is positioned over the mounting bracket 34 of the interior rearview mirror system 22, the button 14 and the rain sensor 20. Preferably, the ledges 63 of the interior rearview mirror system 22 do not contact the ledges 61 of the rain sensor 20 once the interior rearview mirror system 22 is connected to the button 14 and before the interior rearview mirror system 22 is disconnected from the button 14.

As the illustrated interior rearview mirror system 22 is disconnected from the button 14, the ledges 63 of the interior rearview mirror system 22 engage the ledges 61 of the rain sensor 20, thereby operatively disconnecting at least a portion of the rain sensor 20 from the windshield 12. Therefore, as described above, (1) the single body 21b of the rain sensor 20, (2) the first section 58 and the second section 60 of the rain sensor 20 with the double body 21a, or (3) only the second section 60 of the rain sensor 20 with the double body 21a is operatively disconnected from the windshield 12.

The reference numeral 10a (FIGS. 10-12B) generally designates another embodiment of the present invention, having a second embodiment of the visual, rear viewing and rain sensing system for the vehicle. Since visual, rear viewing and rain sensing system 10a is similar to the previously described visual, rear viewing and rain sensing system 10, similar parts appearing in FIGS. 1-9 and FIGS. 10-12B, respectively, are represented by the same, corresponding reference number, except for the suffix "a" in the numerals of the latter. The visual, rear viewing and rain sensing system 10a includes the single body or double body rain sensor 20a operatively coupled to the windshield 12a and the button 14a as described above in the first embodiment of the visual, rear viewing and rain sensing system 10. The interior rearview mirror system 22a of the second embodiment of the visual, rear viewing and rain sensing system 10a includes the ledges 63a on the ends of a substantially inverted U-shaped spring clip 70 instead of extending from the interior surface of the sides of the shell 50a of the mounting foot 38a.

In the illustrated example, the mounting bracket 34a of the interior rearview mirror system 22a includes the substantially inverted U-shaped spring clip 70 having the ledges 63a configured to engage the ledges 61a of the rain sensor 20a to disconnect the rain sensor 20a from the windshield 12a. The substantially inverted U-shaped spring clip 70 includes a first leg 72, a second leg 74 and a spanning portion 76 connecting the first leg 72 and the second leg 74. The ends of the first leg 72 and the second leg 74 include hooks 78 having the ledges 63a at a terminal end thereof configured to engage the ledges 61a of the rain sensor 20a. Furthermore, or as an alternative to the ledges 61a and the ledges 63a described directly above, the hooks 78 could include the ledges 61a' in the bottom of the curve of the hooks 78 that engage ledges 61a' on extensions of the rain sensor 20a (see FIG. 12B).

The illustrated spring clip 70 is connected to the mounting foot 38a of the mounting bracket 34a of the interior rearview mirror system 22a. The hooks 78 of the spring clip 70 slide under the ledges 61a of the rain sensor 20a as the interior rearview mirror system 22a is connected to the button 14a similar to the first embodiment of the visual, rear viewing and rain sensing system 10a for the vehicle. Alternatively, the spring clip 70 could slide over the mounting foot 38a after the mounting foot 38a is connected to the button 14a, wherein the hooks 78 of the spring clip 70 hook under the ledges 61a of the rain sensor 20a (see FIGS. 10 and 11).

In the illustrated example, the rain sensor 20a is operatively coupled to the windshield 12a independent of the interior rearview mirror system 22a. However, as the interior rearview mirror system 22a is detached from the button 14a, the ledges 63a of the interior rearview mirror system 22a engage the ledges 61a of the rain sensor 20a, thereby disconnecting at least a portion of the rain sensor 20a from the windshield 12a. In the second embodiment of the visual, rear viewing and rain sensing system 10a for the vehicle, the ledges 61a of the rain sensor 20a could be located within channels 80 that accept the hooks 78 of the spring clip 70 as the interior rearview mirror system 22a is disconnected from the button 14a.

The reference numeral 10b (FIGS. 13-15A) generally designates another embodiment of the present invention, having a third embodiment of the visual, rear viewing and rain sensing system for the vehicle. Since visual, rear viewing and rain sensing system 10b is similar to the previously described visual, rear viewing and rain sensing system 10a, similar parts appearing in FIG. 10-12B and FIGS. 13-15A, respectively, are represented by the same, corresponding reference number, except for the suffix "b" in the numerals of the latter. The third embodiment of the visual, rear viewing and rain sensing system 10b includes the ledges 61b on the ends of the substantially inverted U-shaped spring clip 70b as in the second embodiment of the visual, rear viewing and rain sensing system 10a, the single body or double body rain sensor 20b operatively coupled to the windshield 12b and the button 14b as described above in the second embodiment of the visual, rear viewing and rain sensing system 10a. The rain sensor 20b of the third embodiment of the visual, rear viewing and rain sensing system 10b can also include the channels 80b having the ledges 61b therein as described above in the second embodiment of the visual, rear viewing and rain sensing system 10a.

The illustrated spring clip 70b of the third embodiment of the visual, rear viewing and rain sensing system 10b for the vehicle is snap fit into position after the interior rearview mirror system 22b has been connected to the button 14b. The legs 72b, 74b of the spring clip 70b include shelves 82 wherein upper portions of the legs 72b, 74b are spaced further apart than lower portions of the legs 72b, 74b. Furthermore, the sides of the shell 50b of the mounting foot 38b include downward facing notches 84 configured to engage the shelves 82 of the spring clip 70b. After the interior rearview mirror system 22b has been connected to the button 14b, the spring clip 70b is fit over the mounting foot 38b of the mounting bracket 34b. Therefore, the shelves 82 of the spring clip 70b snap into position under the notches 84 of the mounting foot 38b and the hooks 78b of the spring clip 70b snap under the ledges 61b of the rain sensor 20b. Thereafter, the ledges 63b of the spring clip 70b pull at least a portion of the rain sensor 20b away from the windshield 12b as the interior rearview mirror system 22b is detached from the button 14b as described above, such that at least a portion of the rain sensor 20b is no longer operatively coupled to the windshield 12b as the interior rearview mirror system 22b is disconnected from the button 14b.

Figure 15:
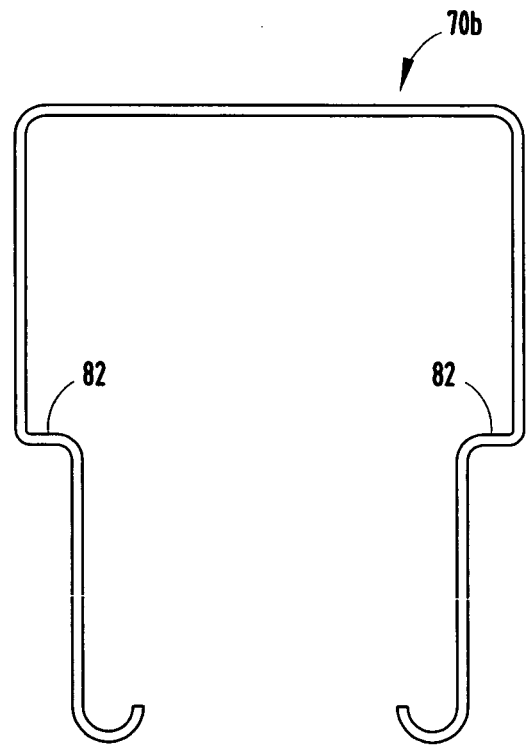
FIG. 15 is a front view of the spring clip of the third embodiment of the present invention.
Figure 15A:
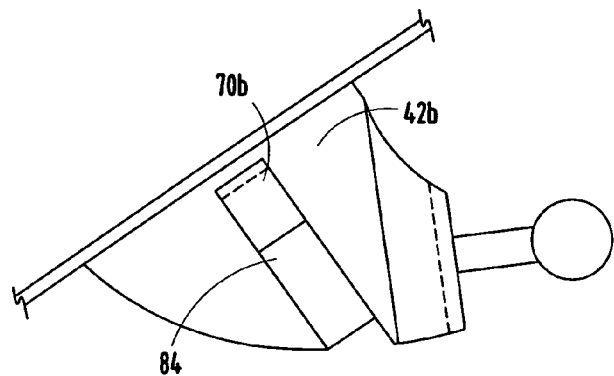
FIG. 15A is a side view of a mounting bracket cover and the spring clip of an alternative version of the third embodiment of the present invention.

FIG. 15A illustrates an alternative version of the third embodiment of the visual, rear viewing and rain sensing system 10b. In the alternative version, the mounting bracket cover 42b, instead of the mounting foot 38b, includes the notches 84 and the spring clip 70b snaps into position under the notches 84 after the first cover portion 44b and the second cover portion 46b of the mounting bracket cover 42b are connected. In the alternative version of the third embodiment of the visual, rear viewing and rain sensing system 10b, the mounting bracket cover 42b preferably includes the first cover portion 44b fitting over an upper portion of the mounting foot 38b and the second cover portion 46b fitting over a lower portion of the mounting foot 38b, thereby providing the substantially horizontal connection.

Figure 16:
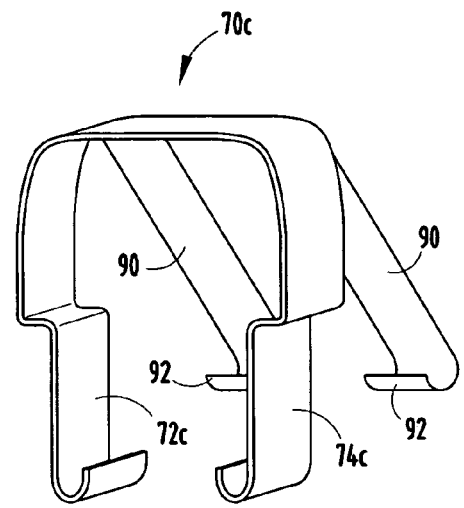
FIG. 16 is a perspective view of a spring clip of the fourth embodiment of the present invention.
Figure 17:
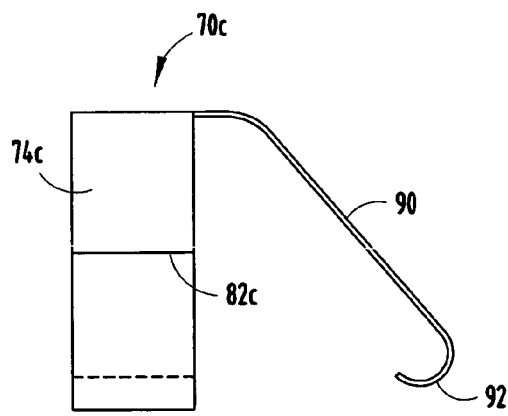
FIG. 17 is a side view of the spring clip of the fourth embodiment of the present invention.
Figure 17A:
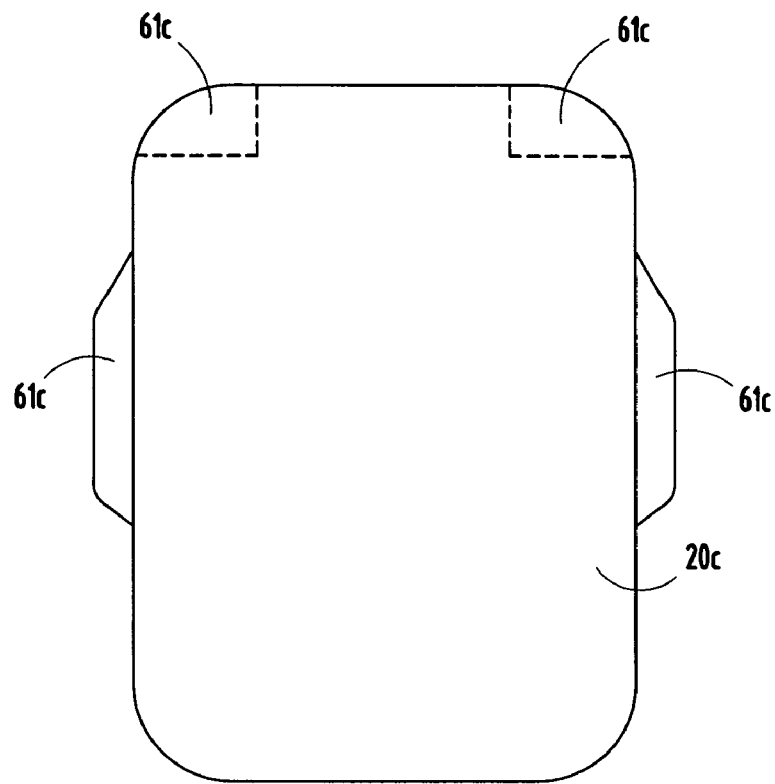
FIG. 17A is a top view of a rain sensor of the fourth embodiment of the present invention.

The reference numeral 10c (FIGS. 16-17A) generally designates another embodiment of the present invention, having a fourth embodiment of the visual, rear viewing and rain sensing system for the vehicle. Since visual, rear viewing and rain sensing system 10c is similar to the previously described second embodiment of the visual, rear viewing and rain sensing system 10a, similar parts appearing in FIGS. 13-15A and FIGS. 16-17A, respectively, are represented by the same, corresponding reference number, except for the suffix "c" in the numerals of the latter. The fourth embodiment of the visual, rear viewing and rain sensing system 10c includes the ledges 63c on the ends of the substantially inverted U-shaped spring clip 70c as in the second embodiment of the visual, rear viewing and rain sensing system 10a, and the rain sensor 20c operatively coupled to the windshield 12c and the button 14c as described above in the first embodiment of the visual, rear viewing and rain sensing system 10. The rain sensor 20c of the fourth embodiment of the visual, rear viewing and rain sensing system 10c can also include the channels 80c and the ledges 61c as described above in the second embodiment of the visual, rear viewing and rain sensing system 10a. Moreover, the spring clip 70c can be connected to the mounting bracket 34c before the interior rearview mirror system 22c is connected to the button 14c as described above in the second embodiment of the visual, rear viewing and rain sensing system 10a or after the interior rearview mirror system 22c is connected to the button 14c as described above in the third embodiment of the visual, rear viewing and rain sensing system 10b.

The spring clip 70c of the fourth embodiment of the visual, rear viewing and rain sensing system 10c includes a pair of extra hooking arms 90 extending in a direction perpendicular to the legs 72c, 74c of the spring clip 70c. The extra hooking arms 90 include hooks 92 on an end thereof positioned under extra upper or lower ledges 61c of the rain sensor 20c. When the spring clip 70c is connected to the mounting bracket 34c before the interior rearview mirror system 22c is connected to the button 14c, the extra ledges 61c of the rain sensor 20c are located on a lower side of the rain sensor 20c such that the hooks 92 of the extra hooking arms 90 slide under the lower ledges 61c as the mount spring 54c is slid into engagement with the button 14c. In this situation, the legs 72c, 74c of the spring clip 70c do not have the shelves 82c. However, when the spring clip 70c is connected to the mounting bracket 34c after the interior rearview mirror system 22c is connected to the button 14c, the extra ledges 61c of the rain sensor 20c can be located on the lower side or the upper side of the rain sensor 20c such that the hooks 92 of the extra hooking arms 90 snap under the lower ledges 61c or the upper ledges 61c, respectfully, as the spring clip 70c is snapped into engagement with the mounting bracket 34c. In this situation, the legs 72c, 74c of the spring clip 70 have the shelves 82c that snap fit into position under the notches 84a of the mounting foot 38c.

Accordingly, the ledges 63c of the spring clip 70c are located under the ledges 61c of the rain sensor 20c once the spring clip 70c and the mounting bracket 34c have been placed into position relative to the button 14c. Thereafter, the ledges 63c of the spring clip 70c pull at least a portion of the rain sensor 20c away from the windshield 12c as the interior rearview mirror system 22c is detached from the button 14c as described above, such that at least a portion of the rain sensor 20c is no longer operatively coupled to the windshield 12c as the interior rearview mirror system 22c is detached from the button 14c. It is further contemplated that the spring clip 70 could only have the extra hooking arms 90 and associated ledges 63c, that engage the upper or lower ledges 61c of the rain sensor 20c, and not the legs 72c, 74c.

Figure 17B:
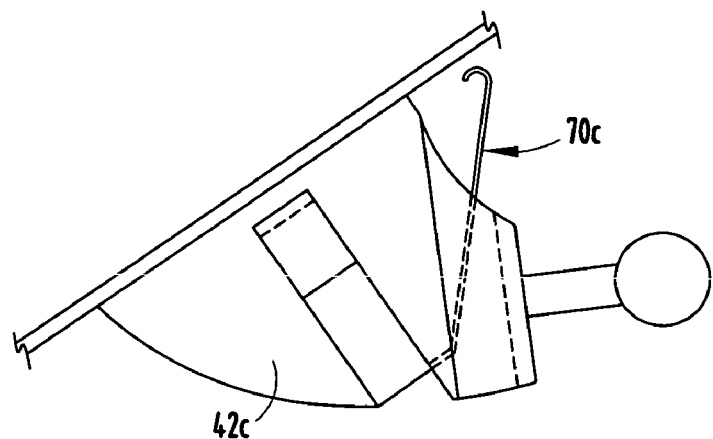
FIG. 17B is a side view of a mounting bracket cover and the spring clip of an alternative version of the fourth embodiment of the present invention.

FIG. 17B illustrates an alternative version of the fourth embodiment of the visual, rear viewing and rain sensing system 10c. In the alternative version, the mounting bracket cover 42c, instead of the mounting foot 38c, includes the notches 84c and the spring clip 70c that snaps into position under the notches 84c after the first cover portion 44c and the second cover portion 46c of the mounting bracket cover 42c are connected. In the alternative version of the fourth embodiment of the visual, rear viewing and rain sensing system 10c, the mounting bracket cover 42c preferably includes the first cover portion 44c fitting over an upper portion of the mounting foot 38c and the second cover portion 46c fitting over a lower portion of the mounting foot 38c, thereby providing the substantially horizontal connection.

Figure 18:
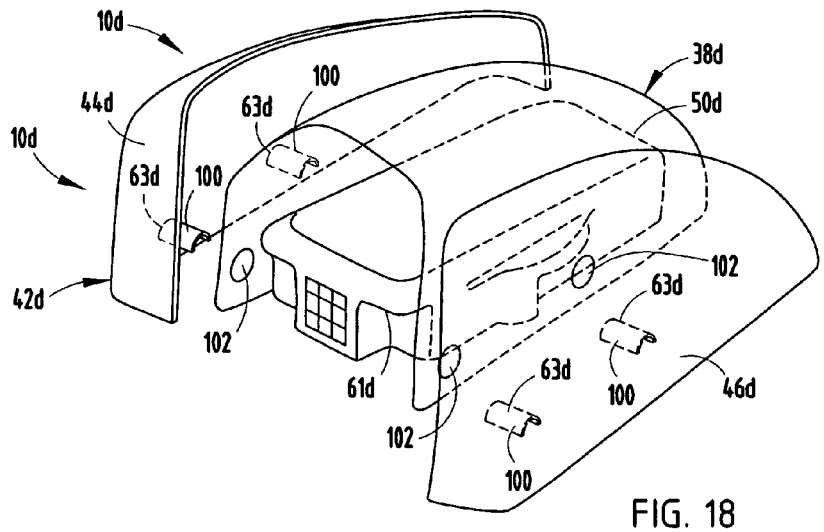
FIG. 18 is a perspective exploded view of a mounting foot, a rain sensor and a mounting bracket cover of a fifth embodiment of the present invention.
Figure 19:
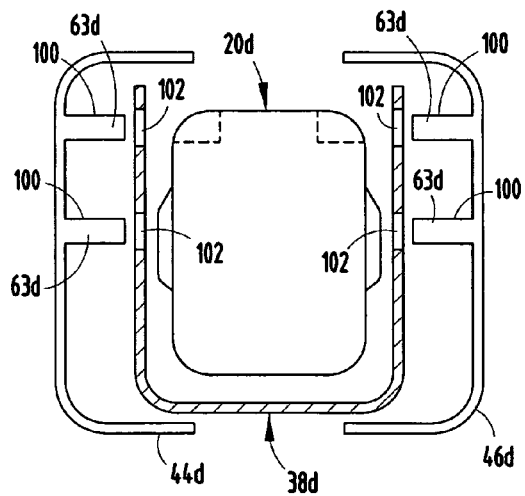
FIG. 19 is an exploded top view of the rain sensor, the mounting foot (cross-sectional) and the mounting bracket cover (cross-sectional) of the fifth embodiment of the present invention.
Figure 20:
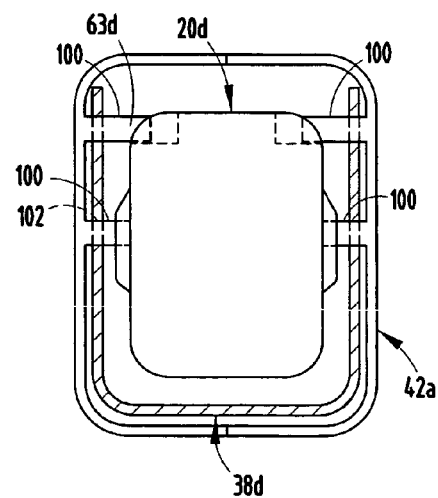
FIG. 20 is a top view of the rain sensor, the mounting foot (cross-sectional) and the mounting bracket cover (cross-sectional) of the fifth embodiment of the present invention.

The reference numeral 10d (FIGS. 18-20) generally designates another embodiment of the present invention, having a fifth embodiment of the visual, rear viewing and rain sensing system for the vehicle. Since visual, rear viewing and rain sensing system 10d is similar to the previously described visual, rear viewing and rain sensing system 10, similar parts appearing in FIGS. 1-9 and FIGS. 18-20, respectively, are represented by the same, corresponding reference number, except for the suffix "d" in the numerals of the latter. The visual, rear viewing and rain sensing system 10d includes the single body or double body rain sensor 20d operatively coupled to the windshield 12d and the button 14d as described above in the first embodiment of the visual, rear viewing and rain sensing system 10. The interior rearview mirror system 22d of the fifth embodiment of the visual, rear viewing and rain sensing system 10d includes the ledges 63d extending from an interior surface of the mounting bracket cover 42d.

In the illustrated example, the mounting bracket cover 42d includes a plurality of integrally molded tabs 100 extending from the interior surface thereof. The tabs 100 are illustrated as being semi-circular in shape, although it is contemplated that any geometric shape could be used. The shell 50d of the mounting foot 38d of the mounting bracket 34d includes apertures 102 configured to accept the tabs 100 as the first cover portion 44d and the second cover portion 46d are fit over the mounting foot 38d. The ledges 61d of the rain sensor 20d are located adjacent the apertures 102 of the shell 50d of the mounting foot 38d such that the tabs 100 are located under the ledges 61d of the rain sensor 20d when the mounting bracket cover 42d is in position over the mounting foot 38d. The ledges 63d of the interior rearview mirror system 22d are located on the upper surfaces of the tabs 100 and the ledges 63d of the interior rearview mirror system 22d engage the ledges 61d of the rain sensor 20d as the interior rearview mirror 22d is detached from the button 14d. Accordingly, the ledges 63d on the tabs 100 of the mounting bracket cover 42d pull at least a portion of the rain sensor 20d away from the windshield 12d as the interior rearview mirror system 22d is detached from the button 14d as described above, such that at least a portion of the rain sensor 20d is no longer operatively coupled to the windshield 12d as the interior rearview mirror system 22d is detached from the button 14d.

The reference numeral 10e (FIG. 21) generally designates another embodiment of the present invention, having a sixth embodiment of the visual, rear viewing and rain sensing system for the vehicle. Since visual, rear viewing and rain sensing system 10e is similar to the previously described visual, rear viewing and rain sensing system 10, similar parts appearing in FIGS. 1-9 and FIG. 21, respectively, are represented by the same, corresponding reference number, except for the suffix "e" in the numerals of the latter. The visual, rear viewing and rain sensing system 10e includes the single body or double body rain sensor 20e operatively coupled to the windshield 12e and the button 14e as described above in the first embodiment of the visual, rear viewing and rain sensing system 10. The interior rearview mirror system 22e of the sixth embodiment of the visual, rear viewing and rain sensing system 10e includes one spring catch 110 extending from the mounting foot 38e of the mounting bracket 34e, with the spring catch 110 having the ledge 63e on an end thereof.

Therefore, in this illustrated embodiment, the interior rearview mirror system 22e only includes one ledge 63e.

Figure 21:
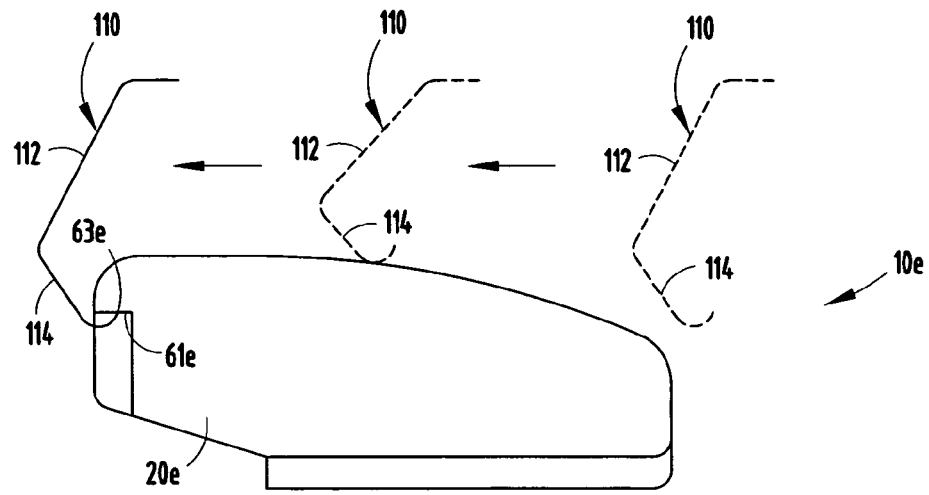
FIG. 21 is a side view of a spring catch and a rain sensor of the sixth embodiment of the present invention.

As illustrated in FIG. 21, the mounting foot 38e includes one spring catch 110 extending from a bottom thereof. The spring catch 110 includes a first section 112 connected to the mounting foot 38e and a second section 114 having the ledge 63e on an end edge thereof. The spring catch 110 will compress (rightmost illustrated spring catch 110 and center illustrated spring catch 110) and the second section 114 will move towards the first section 112 as the spring catch 110 moves over a top surface of the rain sensor 20e when the mount spring 54e is slid into engagement with the grooves 32e on the button 14e. After the spring catch 110 has moved over the top of the rain sensor 20e (leftmost illustrated spring catch 110), the second section 114 will spring away from the first section 112 and snap into place under the ledge 61e of the rain sensor 20e. The ledge 63e of the spring catch 110 can touch the ledge 61e after the ledge 63e is in position or the ledge 63e of the spring catch 110 can be spaced from the ledge 61e of the rain sensor 20e. Therefore, the ledge 63e of the spring catch 110 of the interior rearview mirror system 22e is located under the ledge 61e of the rain sensor 20e, and the ledge 63e of the spring catch 110 engages the ledge 61e of the rain sensor 20e as the interior rearview mirror system 22e is detached from the button 14e. Accordingly, the ledge 63e on the spring catch 110 of the mounting bracket 34e pulls at least a portion of the rain sensor 20e away from the windshield 12e as the interior rearview mirror system 22e is detached from the button 14e as described above, such that at least a portion of the rain sensor 20e is no longer operatively coupled to the windshield 12e as the interior rearview mirror system 22e is detached from the button 14e.

The reference numeral 10f (FIGS. 22-24) generally designates another embodiment of the present invention, having a seventh embodiment of the visual, rear viewing and rain sensing system for the vehicle. Since visual, rear viewing and rain sensing system 10f is similar to the previously described visual, rear viewing and rain sensing system 10e, similar parts appearing in FIG. 21 and FIGS. 22-24, respectively, are represented by the same, corresponding reference number, except for the suffix "f" in the numerals of the latter. The visual, rear viewing and rain sensing system 10f includes the single body or double body rain sensor 20f operatively coupled to the windshield 12f and the button 14f as described above in the first embodiment of the visual, rear viewing and rain sensing system 10. The interior rearview mirror system 22f of the seventh embodiment of the visual, rear viewing and rain sensing system 10f includes more than one spring catch 110f extending from the mounting foot 38f of the mounting bracket 34f, with the spring catches 110f having the ledge 63f on an end thereof.

Figure 22:
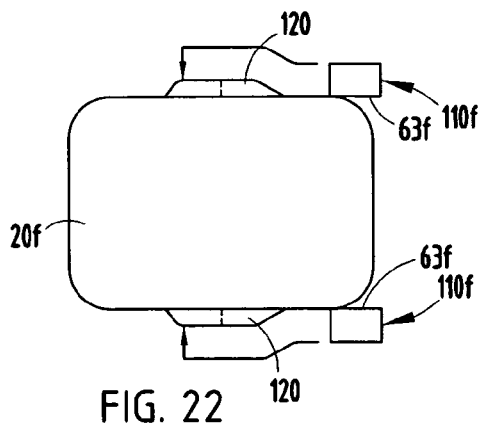
FIG. 22 is a top view of spring catches (cross-sectional) and a rain sensor of the seventh embodiment of the present invention.

As illustrated in FIG. 22, the mounting foot 38f includes two spring catches 110f extending from a bottom thereof. The spring catches 110f have the ledge 63f on an end edge thereof. The rain sensor 20f used in the seventh embodiment of the visual, rear viewing and rain sensing system 10f includes a ramp 120 adjacent the ledge 61f. The spring catches 110f move outward over and abut against sides of the rain sensor 20f and the ramp 120 as the mount spring 54f of the mounting bracket 34f is slid into engagement with the grooves 32f on the button 14f. After the spring catches 110f have moved past the ramp 120, the spring catches 110f will snap into place under the ledges 61f of the rain sensor 20f. The ledges 63f of the spring catches 110f can touch or be spaced from the ledges 61f of the rain sensor 20f after the spring catches 110f have snapped into position.

Figure 23:
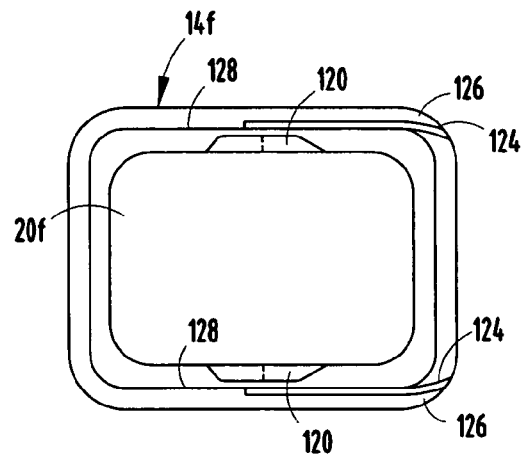
FIG. 23 is a top view of the rain sensor and the button of the seventh embodiment of the present invention.
Figure 24:
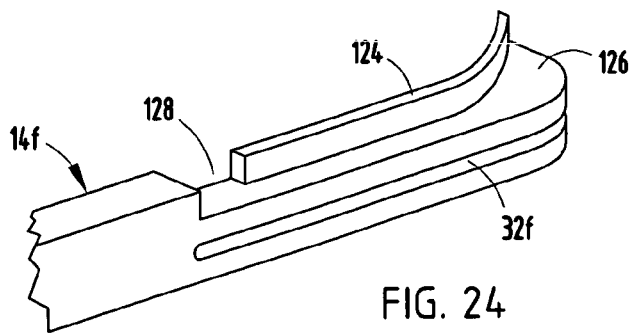
FIG. 24 is a partial perspective view of the button of the seventh embodiment of the present invention.

It is contemplated that instead of abutting against the sides of the rain sensor 20f, the spring catches 110f could abut and move outward over a deflection wall 124 of the button 14f (see FIGS. 23 and 24). In this situation, the button 14f includes a spring guide path 126 on a top surface of the first side segment 28f and the second side segment 30f of the button 14f and above each of the grooves 32f. The spring guide path 126 includes the deflection wall 124, which is located along a portion of the inner circumference 31f on the first side segment 28f and the second side segment 30f of the button 14f. The spring guide path 126 includes an opening 128 at an end of the deflection wall 124. The ledges 63f of the spring catches 110f are placed into position below the ledges 61f of the rain sensor 20f by first having the spring catches 110f move outward over and abut against the deflection wall 124 as the mount spring 54f of the mounting bracket 34f is slid into engagement with the grooves 32f on the button 14f. Thereafter, the spring catches 110f snap into position when the ends of the spring catches 110f encounter the opening 128 at the end of the deflection wall 124. The spring catches 110f can touch or be spaced from the rain sensor 20f after the spring catches 110f snap into position. The button 14f described above is preferably used when the rain sensor 20f has projections extending from sides thereof such that sliding the spring catches 110f over the side surfaces of the rain sensor 20f would be difficult.

When more than one spring catch 110f is employed, the ledges 63f of the spring catches 110f of the interior rearview mirror system 22f are located under the ledges 61f of the rain sensor 20f, and the ledges 63f of the spring catches 110f engage the ledges 61f of the rain sensor 20f as the interior rearview mirror system 22f is detached from the button 14f. Accordingly, the ledges 63f on the spring catches 110f of the mounting bracket 34f pull at least a portion of the rain sensor 20f away from the windshield 12f as the interior rearview mirror system 22f is detached from the button 14f as described above, such that at least a portion of the rain sensor 20f is no longer operatively coupled to the windshield 12f as the interior rearview mirror system 22f is detached from the button 14f.

Figure 25:
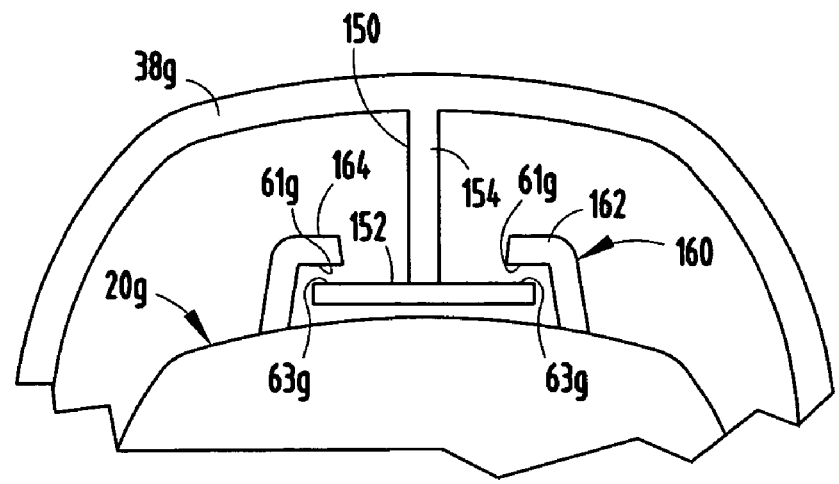
FIG. 25 is a cross-sectional view of a first arrangement of a rain sensor and a mounting foot of the eighth embodiment of the present invention.
Figure 26:
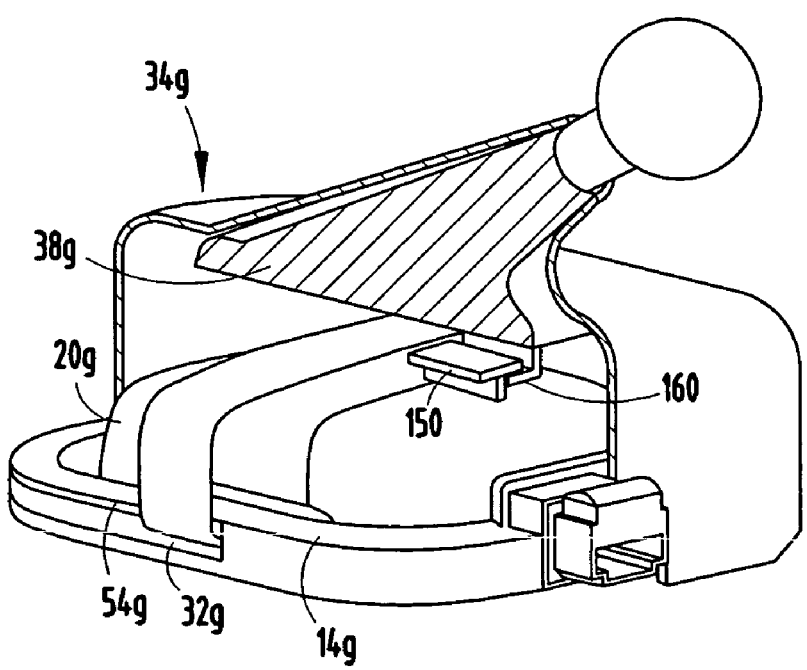
FIG. 26 is a partial perspective view of a second arrangement of the eighth embodiment of the present invention, with the mounting foot partially cut away.

The reference numeral 10g (FIGS. 25-26) generally designates another embodiment of the present invention, having an eighth embodiment of the visual, rear viewing and rain sensing system for the vehicle. Since visual, rear viewing and rain sensing system 10g is similar to the previously described visual, rear viewing and rain sensing system 10, similar parts appearing in FIGS. 1-9 and FIGS. 25-26, respectively, are represented by the same, corresponding reference number, except for the suffix "g" in the numerals of the latter. The visual, rear viewing and rain sensing system 10g includes the single body or double body rain sensor 20g operatively coupled to the windshield 12g and the button 14g as described above in the first embodiment of the visual, rear viewing and rain sensing system 10. The interior rearview mirror system 22g of the eighth embodiment of the visual, rear viewing and rain sensing system 10g includes a T-shaped member 150 engaging with a T-slot 160. In the illustrated example, the T-shaped member 150 includes a cross-piece 152 and a stalk 154 connected to the middle of the cross-piece 152. Furthermore, the T-slot 160 is defined by a first L-shaped part 162 and a second L-shaped part 164.

In a first arrangement of the eighth embodiment of the visual, rear viewing and rain sensing system 10g (FIG. 25), the rain sensor 20g has the T-slot 160 on a top surface thereof and the mounting foot 38g has the T-shaped member 150 extending from a bottom surface thereof. The T-shaped member 150 of the mounting foot 38g is configured to be slid into the T-slot 160 as the mount spring 54g of the mounting bracket 34g is slid into engagement with the grooves 32g on the button 14g. Therefore, in the first arrangement, the ledges 63g of the interior rearview mirror system 22g are located on the upper surface of the cross-piece 152 of the T-shaped member 150 and the ledges 61g of the rain sensor 20g are located on bottom surfaces of the first L-shaped part 162 and the second L-shaped part 164 of the T-slot 160.

In a second arrangement of the eighth embodiment of the visual, rear viewing and rain sensing system 10g (FIG. 26), the rain sensor 20g has the T-shaped member 150 extending a top surface thereof and the mounting foot 38g has the T-slot 160 on a bottom surface. The T-shaped member 150g of the rain sensor 20g is configured to be slid into the T-slot 160 as the mount spring 54g of the mounting bracket 34g is slid into engagement with the grooves 32g on the button 14g. Therefore, in the second arrangement, the ledges 63g of the interior rearview mirror system 22g are located on the upper surface of the first L-shaped part 162 and second L-shaped part 164 of the T-slot 160 and the ledges 61g of the rain sensor 20g are located on bottom surfaces of the cross-piece 152 of the T-shaped member 150.

When the T-shaped member 150 and the T-slot 160 are employed, the ledges 63g of the interior rearview mirror system 22g are located under the ledges 61g of the rain sensor 20g, and the ledges 63g of the interior rearview mirror system 22g engage the ledges 61g of the rain sensor 20g as the interior rearview mirror system 22g is detached from the button 14g. Accordingly, the ledges 63a of the mounting bracket 34g of the interior rearview mirror system 22g pull at least a portion of the rain sensor 20g away from the windshield 12g as the interior rearview mirror system 22g is detached from the button 14g as described above, such that at least a portion of the rain sensor 20g is no longer operatively coupled to the windshield 12g as the interior rearview mirror system 22g is detached from the button 14g.

Figure 27:
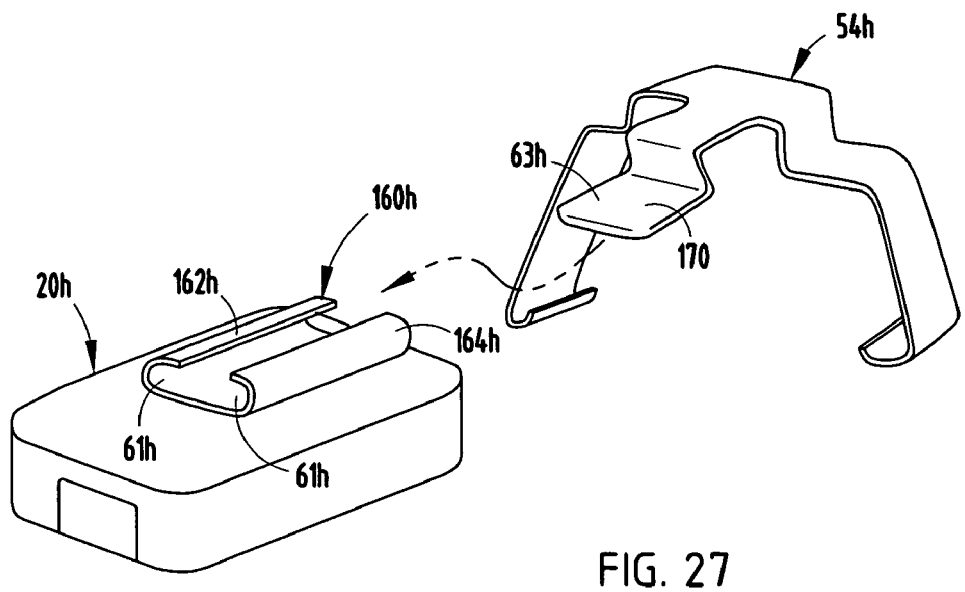
FIG. 27 is an exploded view of a mount clip and a rain sensor of the ninth embodiment of the present invention.

The reference numeral 10h (FIG. 27) generally designates another embodiment of the present invention, having a ninth embodiment of the visual, rear viewing and rain sensing system for the vehicle. Since visual, rear viewing and rain sensing system 10h is similar to the previously described visual, rear viewing and rain sensing system 10g, similar parts appearing in FIGS. 25-26 and FIG. 27, respectively, are represented by the same, corresponding reference number, except for the suffix "h" in the numerals of the latter. The visual, rear viewing and rain sensing system 10h includes the single body or double body rain sensor 20h operatively coupled to the windshield 12h and the button 14h as described above in the eighth embodiment of the visual, rear viewing and rain sensing system 10g. The rain sensor 120h of the ninth embodiment of the visual, rear viewing and rain sensing system 10h includes the T-slot 160h as discussed above in regard to the eighth embodiment of the visual, rear viewing and rain sensing system 10g. Furthermore, the mount spring 54h includes a stepped appendage 170 adapted to slide into the T-slot 160h on the rain sensor 20h as the mount spring 54h is slid into engagement with the grooves 32h on the button 14h. Therefore, the ledge 63h of the interior rearview mirror system 22h is located on the upper surface of the appendage 170 and the ledge 61h of the rain sensor 20h is located on bottom surfaces of the first L-shaped part 162h and the second L-shaped part 164h of the T-slot 160h.

When the T-slot 160h and the appendage 170 of the mount spring 54h are employed, the ledge 63g of the interior rearview mirror system 22h is located under the ledge 61h of the rain sensor 20h, and the ledge 63h of the interior rearview mirror system 22h engages the ledge 61h of the rain sensor 20h as the interior rearview mirror system 22h is detached from the button 14h. Accordingly, the ledges 63h of the mounting bracket 34h of the interior rearview mirror system 22h pull at least a portion of the rain sensor 20h away from the windshield 12h as the interior rearview mirror system 22h is detached from the button 14h as described above, such that at least a portion of the rain sensor 20h is no longer operatively coupled to the windshield 12h as the interior rearview mirror system 22h is detached from the button 14h.

In a preferred embodiment of all of the visual, rear viewing and rain sensing systems 10 for the vehicle described above, the ledges 63 of the interior rearview mirror system 22 do not engage the ledges 61 of the rain sensor 20 until the interior rearview mirror system 22 is detached from the button 14. Therefore, any vibration of the interior rearview mirror system 22 will not vibrate the rain sensor 20. Vibration of the rain sensor 20 can sometimes result in a false positive reading from the rain sensor 20, thereby switching on or speeding up the windshield wipers of the vehicle. Accordingly, the visual, rear viewing and rain sensing system 10 for the vehicle of the present invention improves the accuracy of readings of the rain sensor 20.

Figure 28:
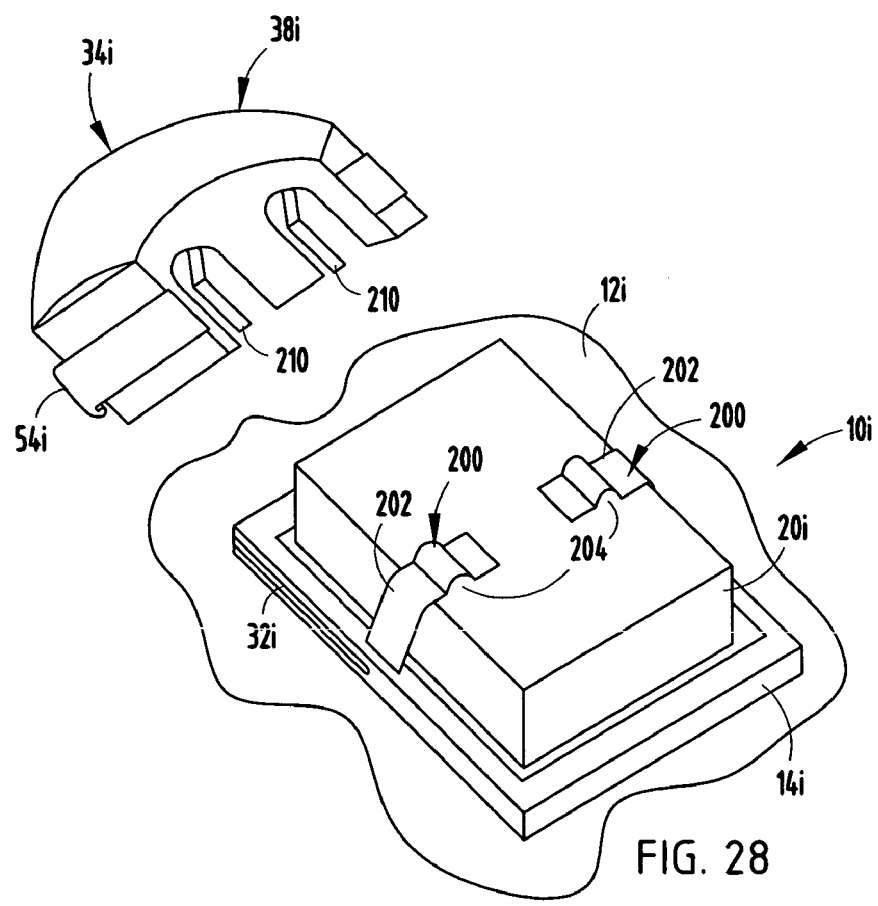
FIG. 28 is an exploded view of a mounting foot, a button and a rain sensor of the tenth embodiment of the present invention.

The reference numeral 10i (FIG. 28) generally designates another embodiment of the present invention, having a tenth embodiment of the visual, rear viewing and rain sensing system for the vehicle. Since visual, rear viewing and rain sensing system 10i is similar to the previously described visual, rear viewing and rain sensing system 10, similar parts appearing in FIGS. 1-9 and FIG. 28, respectively, are represented by the same, corresponding reference number, except for the suffix "i" in the numerals of the latter. The visual, rear viewing and rain sensing system 10i includes the single body or double rain sensor 20i pressed against the windshield 12i.

In the illustrated example, the button 14i includes retainers 200 pressing the rain sensor 20i against the windshield 12i. The retainers 200 include a pair of arms 202 extending from a top surface of the button 14i to cover a top of the rain sensor 20i and to press the rain sensor 20i against the windshield 12i. The retainers 200 are preferably connected to the button 14 or rotate into position after the rain sensor 20i is placed into position against the windshield 12i.

The illustrated mounting foot 38i of the mounting bracket 34i of the interior rearview mirror system 22i includes a pair of feet 210 configured to be inserted below a recess 204 in the retainers 200 as the mount spring 54i is slid into engagement with the grooves 32i on the button 14i. The feet 210 are therefore located between the retainers 200 and rain sensor 20i.

In the illustrated tenth embodiment of the visual, rear viewing and rain sensing system 10i, the feet 210 will pull the retainers 200 away from the button 14i as the interior rearview mirror system 22i is detached from the button 14i to thereby disengage the retainers 200 from the rain sensor 20i, whereby the rain sensor 20i is no longer pressed against the windshield 12i as the interior rearview mirror system 22i is detached from the button 14i. Therefore, the retainers 200 are preferably connected to the button 14i such that no greater than 400 N (90 pounds) of force will be able to separate the retainers 200 from the button 14i.

It will be appreciated by those skilled in the art that various other vehicle accessories and components may be incorporated in the interior rearview mirror system 22 of any of the previously described visual, rear viewing and rain sensing systems 10-10i for a vehicle in whole or in part and in various combinations. Such vehicle accessories and components may be mounted within, on or to the mirror housing 36, the mounting bracket 34, an attachment to the mirror housing 36 or the mounting bracket 34, or in a console or other housing associated with the interior rearview mirror system 22. Additionally, any such vehicle accessories may share components with one another, such as processors, sensors, power supplies, wire harnesses and plugs, displays, switches, antennae, etc. Examples of other vehicle accessories, components or features are described further below.

Figure 29A:
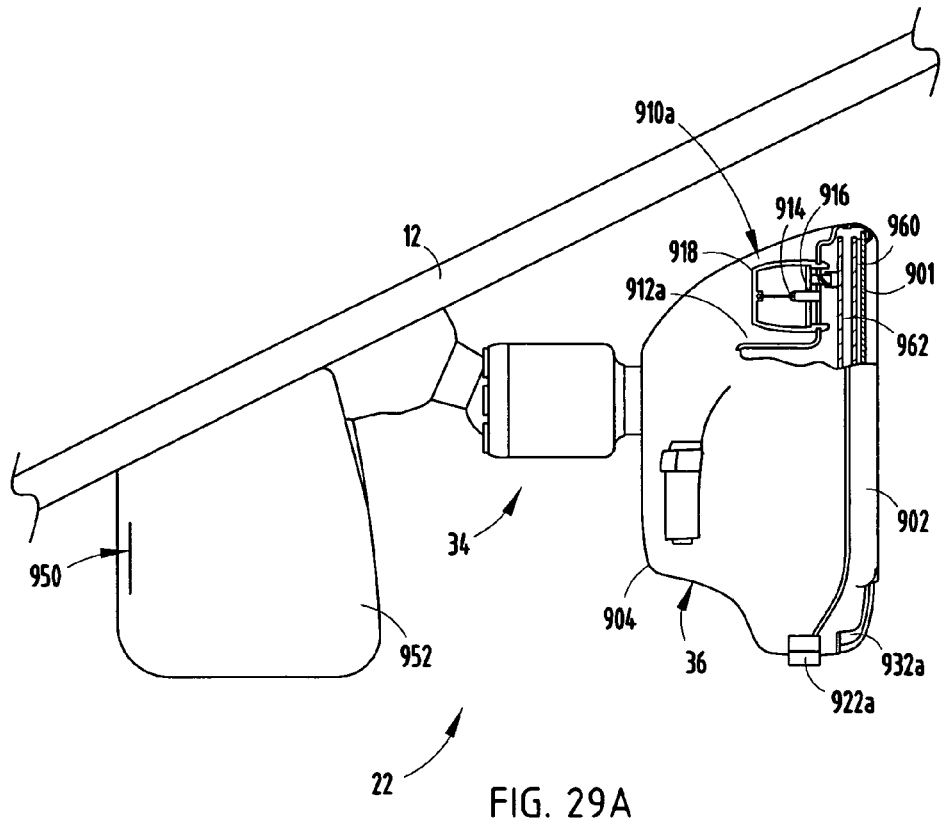
FIG. 29A is an elevational view of the side of the interior rearview mirror system constructed according to the present invention connected to a windshield.
Figure 29B:
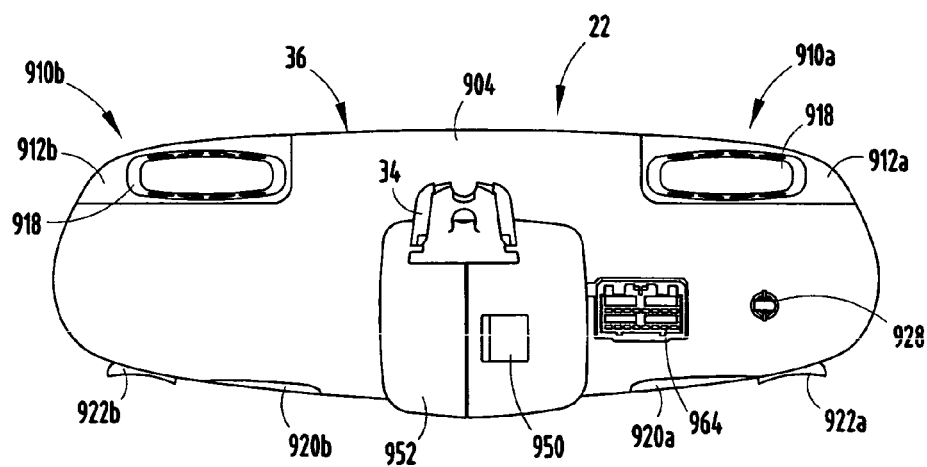
FIG. 29B is an elevational view of the rear of the interior rearview mirror system constructed according to the present invention.
Figure 29C:
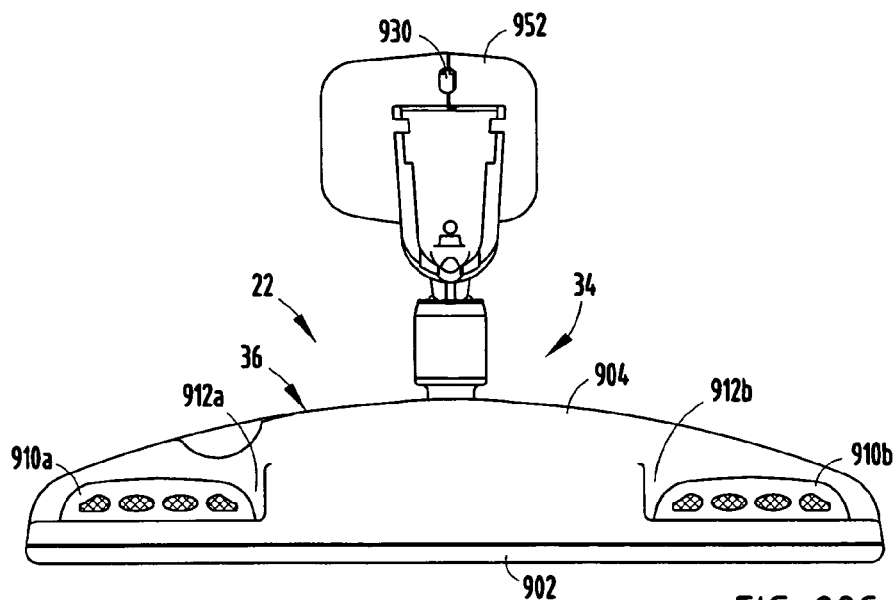
FIG. 29C is a plan view of the top of the interior rearview mirror system constructed according to the present invention.

An example of a system incorporated in the interior rearview mirror system 22 includes an electronic compass system within the mirror housing 36 of the interior rearview mirror system 22 as described in U.S. patent application Ser. No. 60/449,828 entitled "ELECTRONIC COMPASS SYSTEM," the entire contents of which are incorporated in its entirety herein by reference. FIGS. 29A-29C show another embodiment of the interior rearview mirror system 22 in which any of the electronic compass systems described in U.S. patent application Ser. No. 60/449,828 is incorporated. As illustrated in FIGS. 29A-29C, the mirror housing 36 comprises a bezel 902 and a case 904. The bezel 902 and the case 904 combine to define the mirror housing 36 for incorporation of features in addition to a reflective element 901 and information displays 905a and 905b. Commonly assigned U.S. Pat. Nos. 6,102,546; D410,607; 6,407,468; 6,420,800; and 6,471,362, the disclosures of which are incorporated in their entireties herein by reference, describe examples of various bezels, cases and associated button constructions that may be used with the present invention.

Figure 30A:
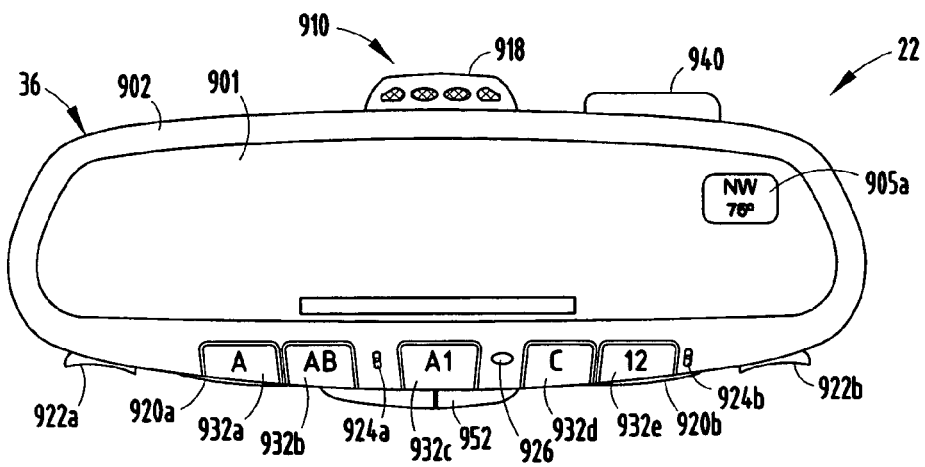
FIG. 30A is an elevational view of the front of the interior rearview mirror system constructed according to the present invention.
Figure 30B:
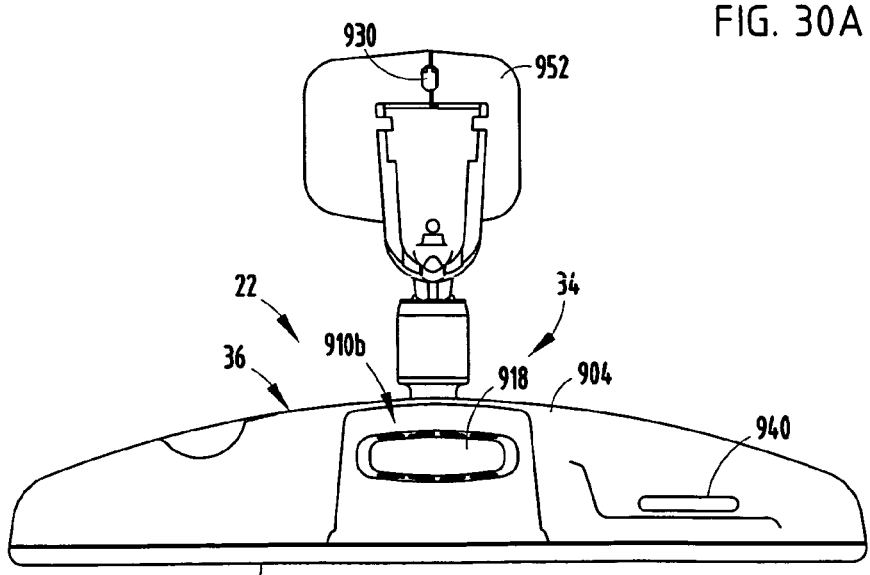
FIG. 30B is a plan view of the top of the interior rearview mirror system constructed according to the present invention.

As depicted in FIGS. 29A-29C, the interior rearview mirror system 22 may comprise first and second microphones 910a and 910b. Examples of microphones for use with the present invention are described in commonly assigned U.S. Pat. Nos. 7,120,261, 6,614,911; and 6,882,734, and PCT Application No. PCT/US02/32386, the disclosures of which are incorporated in their entireties herein by reference. Although the two microphones are shown as being mounted to the backside of mirror case 904, one or more such microphones may be mounted on the top of the interior rearview mirror system 22 (as shown in FIGS. 30A and 30B), on the bottom of the interior rearview mirror system 22, or anywhere within the mirror case 904 or bezel 902. Preferably, two microphones 910a and 910b are incorporated, one near each end, into the interior rearview mirror system 22 on the backside of the mirror case 904 within recessed portions 912a and 912b. As shown in FIG. 29A, the microphones are constructed with an acoustic dam 914 extending around transducer 916 within microphone housing 918. Additional details of this preferred construction are disclosed in commonly assigned International PCT Application No. PCT/US02/32386, the entire disclosure of which is incorporated herein by reference. The audio systems including the microphones may be integrated, at least in part, in a common control with information displays and/or may share components with the information displays. In addition, the status of these systems and/or the devices controlled thereby may be displayed on the associated information displays.

As shown in FIGS. 30A and 30B, a single microphone 910 is provided on the top side of the mirror housing 36. In this construction, it is preferable to include two transducers in microphone housing 918 in a manner similar to that disclosed in the above-referenced International PCT Application No. PCT/US02/32386 and U.S. Pat. No. 6,882,734.

The interior rearview mirror system 22 may include first and second illumination assemblies 920a and 920b. Various illumination assemblies and illuminators for use with the present invention are described in commonly assigned U.S. Pat. Nos. 5,803,579; 6,335,548; 6,441,943; 6,521,916; 6,523,976; 6,670,207; and 6,805,474, as well as commonly assigned U.S. patent application Ser. No. 09/723,675, the disclosures of which are incorporated in their entireties herein by reference. Each illumination assembly preferably comprises a reflector, a lens and an illuminator (not shown). There may be two illumination assemblies generally positioned to illuminate a front passenger seat area and the second generally positioned to illuminate a driver seat area. Alternatively, there may be only one illumination assembly that illuminates both seat areas and/or there may be additional illuminator assemblies such as one to illuminate a center console area, overhead console area or an area between the front seats.

The interior rearview mirror system 22 may also include first and second switches 922a and 922b. Suitable switches for use with the present invention are described in detail in commonly assigned U.S. Pat. Nos. 6,407,468; 6,420,800; 6,426,568; 6,471,362; and 6,614,579, the disclosures of which are incorporated in their entireties herein by reference. These switches may be incorporated to control the illumination assemblies, the displays, the mirror reflectivity, a voice activated system, a compass system, a telephone system, a highway toll booth interface, a telemetry system, a headlight controller, a rain sensor, a tire pressure monitoring system, a navigation system, a lane departure warning system, an adaptive cruise control system, etc. Any other display or system described herein or within the references incorporated by reference may be incorporated in any location within the associated vehicle and may be controlled using the switches.

The interior rearview mirror system 22 may also include first and second indicators 924a and 924b. Various indicators for use with the present invention are described in commonly assigned U.S. Pat. Nos. 5,803,579; 6,335,548; 6,441,943; 6,521,916; 6,523,976; 6,670,270; and 6,805,474, as well as commonly assigned U.S. patent application Ser. No. 09/723,675, the disclosures of which are incorporated in their entireties herein by reference. These indicators may indicate the status of the displays, the mirror reflectivity, a voice activated system, a compass system, a telephone system, a highway toll booth interface, a telemetry system, a headlight controller, a rain sensor, a security system, etc. Any other display or system described herein or within the references incorporated by reference may be incorporated in any location within the associated vehicle and may have a status depicted by the indicators.

The interior rearview mirror system 22 may further include first and second light sensors 926 and 928 serving as glare and ambient sensors, respectively. Preferred light sensors for use within the present invention are described in detail in commonly assigned U.S. Pat. Nos. 5,923,027; 6,313,457; 6,359,274; 6,379,013; 6,402,328; 6,679,608; and 6,831,268, the disclosures of which are incorporated in their entireties herein by reference. The glare sensor 926 and/or ambient sensor 928 automatically control the reflectivity of a self dimming reflective element as well as the intensity of information displays and/or backlighting. The glare sensor 926 may also be used to sense headlights of trailing vehicles and the ambient sensor is used to detect the ambient lighting conditions that the system is operating within. In another embodiment, a sky sensor 930 may be incorporated positioned to detect light levels generally above and in front of an associated vehicle. The sky sensor 930 may be used to automatically control the reflectivity of a self-dimming element, the exterior lights of a controlled vehicle and/or the intensity of information displays. The interior rearview mirror system 22 may further include sun-load sensors for sensing light levels towards the driver side and passenger side of the vehicle so as to control the climate control system of the vehicle.

Additionally, the interior rearview mirror system 22 may include first, second, third, fourth and fifth operator interfaces 932a-932e located in the mirror bezel 902. Each operator interface is shown to comprise a backlit information display "A," "AB," "A1," "C," and "12." It should be understood that these operator interfaces can be incorporated anywhere in the associated vehicle, for example, in the mirror case, accessory module, instrument panel, overhead console, dash board, seats, center console, etc. Suitable switch construction is described in detail in commonly assigned U.S. Pat. Nos. 6,407,468; 6,420,800; 6,426,568; 6,471,362; and 6,614,579, the disclosures of which are incorporated in their entireties herein by reference. These operator interfaces may control the illumination assemblies, the displays, the mirror reflectivity, a voice activated system, a compass system, a telephone system, a highway toll booth interface, a telemetry system, a headlight controller, a rain sensor, a tire pressure monitoring system, a navigation system, a lane departure warning system, an adaptive cruise control system, etc. Any other display or system described herein or within the references incorporated by reference may be incorporated in any location within the associated vehicle and may be controlled using an operator interface or interfaces. For example, a user may program a display or displays to depict predetermined information or may program a display or displays to scroll through a series of information, or may enter set points associated with certain operating equipment with associated sensor inputs to display certain information upon the occurrence of a given event. In one embodiment, for example, a given display may be in a non-illuminated state until the engine temperature is above a threshold, the display then automatically is set to display the engine temperature. Another example is that proximity sensors located on the rear of a vehicle may be connected to a controller and combined with a display in a rearview mirror to indicate to a driver the distance to an object; the display may be configured as a bar that has a length proportional to the given distance.

Although specific locations and numbers of these additional features are depicted in FIGS. 29A-29C and 30A and 30B, it should be understood that fewer or more individual devices may be incorporated in any location within the associated vehicle and as described within the references incorporated herein.

A mounting bracket 34 is included for mounting the interior rearview mirror system 22 within a vehicle either to the windshield 12, or to the vehicle roof structure. It should be understood that a host of accessories may be incorporated into the mounting bracket 34 or into a housing 952 attached to the mounting bracket 34 such as the rain sensor 20 (and therefore outside of a periphery of the button 14), a camera, a headlight control, an additional microprocessor, additional information displays, compass sensors, etc. These systems may be integrated, at least in part, in a common control with information displays and/or may share components with the information displays. In addition, the status of these systems and/or the devices controlled thereby may be displayed on the associated information displays.

The interior rearview mirror system 22 is shown in FIG. 29A to further comprise a circuit board 960 on which the compass sensor module (not shown) may be mounted, and a daughter board 962 with an input/output bus interface (not shown).

The electrical output signal from either, or both, of the sensors 926 and 928 may be used as inputs to a controller (not shown) to control the reflectivity of the reflective element 901 and/or the intensity of any one or all of the displays 905a and 905b. The details of various control circuits for use herewith are described in commonly assigned U.S. Pat. Nos. 5,883,605; 5,956,012; 6,084,700; 6,222,177; 6,244,716; 6,247,819; 6,249,369; 6,392,783 and 6,402,328, the disclosures of which are incorporated in their entireties herein by reference. These systems may be integrated, at least in part, in a common control with information displays and/or may share components with the information displays. In addition, the status of these systems and/or the devices controlled thereby may be displayed on the associated information displays.

Although the compass sensor module is described as being mounted to circuit board 960, it should be understood that the sensor module may be located within the mounting bracket 34, with an accessory module 952 of the interior rearview mirror system 22 or at any location within an associated vehicle such as under a dash board, in an overhead console, a center console, a trunk, an engine compartment, etc. The above described compass systems may be integrated, at least in part, in a common control with information displays and/or may share components with the information displays. In addition, the status of these systems and/or the devices controlled thereby may be displayed on the associated information displays.

The circuit board 960 may comprise a controller (not shown), such as a microprocessor, and the daughter board 962 may comprise an information display 905a. The microprocessor may, for example, receive signal(s) from the compass sensor module and process the signal(s) and transmit signal(s) to the daughter board to the control display 905a to indicate the corresponding vehicle heading. As described herein and within the references incorporated by reference herein, the controller may receive signal(s) from light sensor(s) rain sensor(s), automatic vehicle exterior light controller(s) (not shown), microphone(s), global positioning systems (not shown), telecommunication systems (not shown), operator interface(s) and a host of other devices, and control the information display(s) to provide appropriate visual indications.

The controller (or controllers) used to control the compass system may, at least in part, control the reflectivity of the reflective element 901, exterior lights, the rain sensor 20, compass, information displays, windshield wipers, heater, defroster, defogger, air conditioning, telephone system, navigation system, security system, tire pressure monitoring system, a garage door opening transmitter, remote keyless entry, telemetry systems, voice recognition systems such as digital signal processor based voice actuation systems, and vehicle speed. The controller (or controllers) may receive signals from switches and/or sensors associated with any of the devices described herein and in the references incorporated by reference herein to automatically manipulate any other device described herein or described in the references included by reference. The controller may be, at least in part, located outside the interior rearview mirror system 22 or may comprise a second controller elsewhere in the vehicle or additional controllers throughout the vehicle. The individual processors may be configured to communicate serially, in parallel, via BLUETOOTH™ protocol, wireless communication, over the vehicle bus, over a CAN bus or any other suitable communication. A multi-pin connector interface 964 may be provided for such external connections.

Exterior light control systems as described in commonly assigned U.S. Pat. Nos. 5,990,469; 6,008,486; 6,130,421; 6,130,448; 6,255,639; 6,049,171; 5,837,994; 6,403,942; 6,281,632; 6,291,812; 6,469,739; 6,465,963; 6,429,594; 6,379,013; 6,653,614; 6,611,610; 6,621,616; 6,587,573; 6,861,809; and 6,774,988 and U.S. patent application Nos. 60/404,879 and 60/394,583, the disclosures of which are incorporated in their entireties herein by reference, may be incorporated in accordance with the present invention. These systems may be integrated, at least in part, in a common control with information displays and/or may share components with the information displays. In addition, the status of these systems and/or the devices controlled thereby may be displayed on the associated information displays. As disclosed in U.S. Pat. No. 6,587,573, both the compass sensors and the imaging sensor array 950, may be housed in an accessory housing 952 attached to the mount bracket 34.

Moisture sensors and windshield fog detector systems are described in commonly-assigned U.S. Pat. Nos. 5,923,027; 6,313,457; 6,681,163; and 6,617,564, the disclosures of which are incorporated in their entireties herein by reference. These systems may be integrated, at least in part, in a common control with information displays and/or may share components with the information displays. In addition, the status of these systems and/or the devices controlled thereby may be displayed on the associated information displays.

Commonly assigned U.S. Pat. No. 6,262,831, the disclosure of which is incorporated herein by reference in its entirety, describes power supplies for use with the present invention. These systems may be integrated, at least in part, in a common control with information displays and/or may share components with the information displays. In addition, the status of these systems and/or the devices controlled thereby may be displayed on the associated information displays.

The interior rearview mirror system 22 may further include one or more antennae 940 for receipt and/or transmission of RF signals. Appropriate receiving, transmitting, and/or processing circuitry may further be included in or attached to the interior rearview mirror system 22. Such antennae may be used for a cellular telephone system, a BLUETOOTH™ transmitting/receiving system, a remote keyless entry (RKE) system, a trainable garage door opener system, a tire pressure monitoring system, a global positioning satellite system, a LORAN system, etc. Some of these systems may share a common antenna and receiving, transmitting, processing, and display circuits where appropriate. Examples of a tire pressure monitoring system incorporated in an interior rearview mirror system are disclosed in commonly assigned U.S. Pat. Nos. 6,215,389; 6,431,712; 6,861,942; and 6,696,935, the entire disclosures of which are incorporated herein by reference. Examples of a GPS system incorporated in the interior rearview mirror system 22 are disclosed in commonly assigned U.S. Pat. Nos. 6,166,698; 6,297,781; 6,396,446; and 6,980,092, the entire disclosures of which are incorporated herein by reference. An example of a LORAN system incorporated in an interior rearview mirror system is disclosed in commonly assigned U.S. Pat. No. 6,539,306, the entire disclosure of which is incorporated herein by reference. An example of both a telephone/telematics system and a BLUETOOTH™ system incorporated in an interior rearview mirror system is disclosed in commonly assigned U.S. Pat. No. 6,980,092, the entire disclosure of which is incorporated herein by reference. Examples of a trainable garage door opening systems and RKE systems incorporated in an interior rearview mirror system are disclosed in U.S. Pat. No. 6,091,343, the entire disclosures of which are incorporated herein by reference.

The interior rearview mirror system 22 may further include an infrared (IR) transmitter/receiver for transmitting/receiving information to and from the interior rearview mirror system 22 and possibly to and from the vehicle. An example of such an interior rearview mirror system is disclosed in commonly-assigned U.S. Pat. No. 6,407,712, the entire disclosure of which is incorporated herein by reference.

The interior rearview mirror system 22 may further include one or more of the same or different types of displays. Examples of different types of displays include vacuum fluorescent, LCD, reverse LCD, LED, organic LED, dot matrix, backlit indicia, etc. For displays intended to simultaneously display significant amounts of information, the display disclosed in commonly assigned U.S. Pat. No. 6,346,698 may be used. The entire disclosure of which is incorporated herein by reference. Examples of backlit indicia panel displays are disclosed in commonly-assigned U.S. Pat. Nos. 6,170,956; 6,356,376; 6,870,655; and 6,572,233, the entire disclosures of which are incorporated herein by reference. Various displays used in interior rearview mirror systems are disclosed in commonly assigned U.S. Pat. No. 6,356,376 and in U.S. Pat. No. 6,700,692, the entire disclosures of which are incorporated herein by reference.

The wiring for the vehicle accessories in the interior rearview mirror system 22 may be run through the mounting bracket 34 and along the windshield 12 (if the mounting bracket 34 does not already extend to the headliner) under the wire cover 37. An example of an interior rearview mirror system in which the wiring for accessories in the mirror housing 36 are routed through the mounting bracket 34 is disclosed in commonly assigned U.S. Pat. No. 6,467,919, the entire disclosure of which is incorporated herein by reference.

While the present invention has been described as being implemented with the sensors positioned within the mirror housing 36 of the interior rearview mirror system 22, the sensors could be mounted in the mounting foot 38 or in any other location of the interior rearview mirror system 22. Further still, any or all of the various components of the inventive electronic compass may be mounted elsewhere in the vehicle. It will be further appreciated that certain embodiments of the present invention are novel and useful in vehicles such as land-based vehicles (i.e., automobiles, trucks, sport utility vehicles (SUVs), trains, motorcycles, bicycles, mopeds, scooters, snowmobiles, all-terrain vehicles (ATVs), military vehicles) as well as in other vehicles such as airplanes, marine vessels, and amphibious vehicles.

Although the present invention is described as utilizing a process whereby the signals output from the magnetic sensing circuit are plotted in reference to one another in a two- or three-dimensional coordinate system, an analogous approach may be to process and analyze the signals separately and then compare the results of the separate analysis to arrive at a similar result.

The above description is considered that of the preferred embodiments only.

Modifications of the invention will occur to those skilled in the art and to those who make or use the invention. Therefore, it is understood that the embodiments shown in the drawings and described above are merely for illustrative purposes and not intended to limit the scope of the invention.

Moreover, the foregoing detailed description is considered that of a preferred embodiment only, and the particular shape and nature of at least some of the components in this embodiment are at least partially based on manufacturing advantages and considerations as well as on those pertaining to assembly and operation. Modifications of this embodiment may well occur to those skilled in the art and to those who make or use the invention after learning the nature of this preferred embodiment, and the invention lends itself advantageously to such modification and alternative embodiments. For example, the rain sensor 20 could be located outside of the button 14, but adjacent the button 14, such that the interior rearview mirror system 22 could have ledges 63 or any other mechanism to engage the rain sensor 20 such that the rain sensor 20 would no longer be operatively connected to the windshield 12. Furthermore, it is contemplated that the double body rain sensor 21a could have the first section 58 of the rain sensor 21a integral with the button 14, wherein the button 14 is connected to the windshield 12 and the second section 60 of the rain sensor 20a is connected to the integral first section 58 of the rain sensor 20 and the button 14. Therefore, it is to be understood that the embodiment shown in the drawings and described above is provided principally for illustrative purposes and should not be used to limit the scope of the invention.

We claim:

1. An interior rear viewing and sensing system for a vehicle having a windshield and a button connected thereto comprising:
    a sensor configured to be connected to the windshield and be located adjacent the button; and
    an interior rearview mirror system configured to be connected to the button and to cover the sensor;
    the sensor being configured to be operatively coupled to the windshield independent of the interior rearview mirror system;
    wherein at least a portion of the sensor is no longer operatively coupled to the windshield as the interior rearview mirror system is detached from the button.

2. The interior rear viewing and sensing system of claim 1, wherein:
    the sensor comprises a first section and a second section, the first section being configured to be connected to the windshield and the second section being removably connected to the first section; and
    the second section is the at least the portion of the sensor, whereby the first section remains operatively coupled to the windshield and the second section is no longer operatively coupled to the windshield as the interior rearview mirror system is detached from the button.

3. The interior rear viewing and sensing system of claim 2, wherein:
    the second section of the sensor and the interior rearview mirror system include facing ledges adapted to engage as the interior rearview mirror system is detached from the button, whereby the ledge of the interior rearview mirror system engages the ledge of the second section of the sensor to disconnect the second section of the sensor from the first section of the sensor as the interior rearview mirror system is detached from the button.

4. The interior rear viewing and sensing system of claim 3, wherein:
    the second section of the sensor includes one ledge and the interior rearview mirror system includes one ledge.

5. The interior rear viewing and sensing system of claim 3, wherein:
    the second section of the sensor includes a plurality of ledges and the interior rearview mirror system includes a plurality of ledges.

6. The interior rear viewing and sensing system of claim 2, wherein:
    the first section is configured to extend no further than 10 mm from the windshield.

7. The interior rear viewing and sensing system of claim 1, wherein:
    the at least a portion of the sensor and the interior rearview mirror system include facing ledges adapted to engage as the interior rearview mirror system is detached from the button, whereby the ledge of the interior rearview mirror system engages the ledge of the sensor as the interior rearview mirror system is detached from the button, whereby the at least the portion of the sensor is no longer operatively coupled to the windshield as the interior rearview mirror system is detached from the button.

8. The interior rear viewing and sensing system of claim 7, wherein:
    the at least a portion of the sensor includes one ledge and the interior rearview mirror system includes one ledge.

9. The interior rear viewing and sensing system of claim 7, wherein:
    the at least a portion of the sensor includes a plurality of ledges and the interior rearview mirror system includes a plurality of ledges.

10. The interior rear viewing and sensing system of claim 1, wherein:
    the at least a portion of the sensor is the entire sensor.

11. The interior rear viewing and sensing system of claim 1, wherein:
    the sensor is configured to be pressed against the windshield by at least one retainer extending from the button; and
    the interior rearview mirror system is configured to engage the at least one retainer of the button as the interior rearview mirror system is detached from the button to disengage the at least one retainer from the sensor, whereby the at least the portion of the sensor is no longer pressed against the windshield as the interior rearview mirror system is detached from the button.

12. The interior rear viewing and sensing system of claim 1, wherein:
    the sensor is configured to be operatively coupled to the windshield by being pressed against the windshield; and
    wherein the at least a portion of the sensor is no longer pressed against the windshield as the interior rearview mirror system is detached from the button.

13. The interior rear viewing and sensing system of claim 1, wherein:
    the sensor is configured to be operatively coupled to the windshield by being connected to the windshield; and
    wherein the at least a portion of the sensor is no longer connected to the windshield as the interior rearview mirror system is detached from the button.

14. The interior rear viewing and sensing system of claim 1, wherein:
    the interior rearview mirror system comprises a mirror housing and a mounting bracket, the mounting bracket being configured to be connected to the button.

15. The interior rear viewing and sensing system of claim 14, wherein:
    the mounting bracket is configured to disconnect from the button when the mounting bracket is subjected to a force no greater than 400 N (90 pounds) in any direction that is not more than 45° from a forward longitudinal direction of motion of the vehicle.

16. The interior rear viewing and sensing system of claim 15, wherein:
    the at least a portion of the sensor and the mounting bracket include facing ledges adapted to engage as the interior rearview mirror system is detached from the button, whereby the ledge of the mounting bracket engages the ledge of the sensor as the interior rearview mirror system is detached from the button, whereby the at least the portion of the sensor is no longer operatively coupled to the windshield as the interior rearview mirror system is detached from the button.

17. The interior rear viewing and sensing system of claim 16, wherein:
the at least a portion of the sensor includes a plurality of ledges and mounting bracket includes a plurality of ledges.

18. The interior rear viewing and sensing system of claim 17, wherein:
the ledges of the mounting bracket are located on ribs extending from the mounting bracket.

19. The interior rear viewing and sensing system of claim 17, wherein:
the mounting bracket includes a pair of hooks configured to extend into grooves in the button to connect the interior rearview mirror system to the button.

20. The interior rear viewing and sensing system of claim 17, wherein:
the ledges of the mounting bracket are located on spring clips extending from the mounting bracket.

21. The interior rear viewing and sensing system of claim 20, wherein:
the mounting bracket includes a mounting foot; and
the spring clips include shelves for snapping the spring clips onto the mounting foot.

22. The interior rear viewing and sensing system of claim 16, wherein:
a first one of the mounting bracket and the sensor includes a T-shaped member;
a second one of the mounting bracket and the sensor includes a T-shaped slot configured to accept the T-shaped member therein; and
the ledges are located on the T-shaped member and the T-shaped slot.

23. The interior rear viewing and sensing system of claim 22, wherein:
the mounting bracket includes the T-shaped member; and
the sensor includes the T-shaped slot.

24. The interior rear viewing and sensing system of claim 22,.wherein:
the sensor includes the T-shaped member; and
the mounting bracket includes the T-shaped slot.

25. The interior rear viewing and sensing system of claim 14, further including:
a mounting bracket cover extending over the mounting bracket;
wherein the at least a portion of the sensor and the mounting bracket cover include facing ledges adapted to engage as the interior rearview mirror system is detached from the button, whereby the ledge of the mounting bracket cover engages the ledge of the sensor as the interior rearview mirror system is detached from the button, whereby the at least the portion of the sensor is no longer operatively coupled to the windshield as the interior rearview mirror system is detached from the button.

26. The interior rear viewing and sensing system of claim 1, wherein:
the sensor is a rain sensor.

27. The interior rear viewing and sensing-system of claim 1, wherein:
the sensor is configured to be surrounded by the button.

28. A viewing system for a vehicle having a windshield, a button connected thereto and a sensor being retained against the windshield by at least one retainer, the viewing system comprising:
an interior rearview mirror system configured to be connected to the button and be adjacent the sensor, the interior rearview mirror system including a mechanism configured to engage the at least one retainer;
wherein the interior rearview mirror system does not bias the sensor against the windshield when the interior rearview mirror system is connected to the button; and
wherein the mechanism is configured to engage the retainer as the at least one interior rearview mirror system is detached from the button to thereby pull the at least one retainer away from the sensor, thereby allowing the sensor to fall from the windshield.

29. The viewing system of claim 28, wherein:
the interior rearview mirror system is configured to engage the at least one retainer extending from the button and pressing the sensor against the windshield as the interior rearview mirror system is detached from the button to disengage the at least one retainer from the sensor, whereby the at least the portion of the sensor is no longer pressed against the windshield as the interior rearview mirror system is detached from the button.

30. The viewing system of claim 28, wherein:
the interior rearview mirror system comprises a mirror housing and a mounting bracket, the mounting bracket being configured to be connected to the button.

31. The viewing system of claim 30, wherein:
the mounting bracket disconnects from the button when the mounting bracket is subjected to a force no greater than 400 N (90 pounds) in any direction that is not more than 45° from a forward longitudinal direction of motion of the vehicle.

32. The viewing system of claim 28, wherein:
the interior rearview mirror is configured to cover the sensor.

33. The viewing system of claim 28, wherein:
the interior rearview mirror is configured to be connected to the button and be adjacent the sensor when the button and the sensor are not integral.

34. The viewing system of claim 28, wherein:
the interior rearview mirror is configured to cover the sensor.

35. The viewing system of claim 28, wherein:
the interior rearview mirror is configured to be connected to the button and be adjacent the sensor when the button and the sensor are not integral.

36. A viewing system for a vehicle having a windshield and a button and a sensor being connected to the windshield, the viewing system comprising:
an interior rearview mirror system configured to be connected to the button and be adjacent the sensor, the interior rearview mirror system including a mechanism configured to engage the sensor;
wherein the interior rearview mirror system does not bias the sensor against the windshield when the interior rearview mirror system is connected to the button; and
wherein the mechanism is configured to engage at least a portion of the sensor as the interior rearview mirror system is detached from the button to thereby pull the at least the portion of the sensor away from the windshield.

37. The viewing system of claim 36, wherein:
the interior rearview mirror system includes ledges adapted to engage ledges of the sensor as the interior rearview mirror system is detached from the button, whereby the at least the portion of the sensor is no longer operatively coupled to the windshield as the interior rearview mirror system is detached from the button.

38. The viewing system of claim 36, wherein:
the interior rearview mirror system comprises a mirror housing and a mounting bracket, the mounting bracket being configured to be connected to the button.

39. The viewing system of claim 38, wherein:
the mounting bracket include at least one ledge adapted to engage at least one ledge of the sensor as the interior rearview mirror system is detached from the button, whereby the at least the portion of the sensor is no longer operatively coupled to the windshield as the interior rearview mirror system is detached from the button.

40. The viewing system of claim 39, wherein:
the mounting bracket includes a plurality of ledges.

41. The viewing system of claim 40, wherein:
the ledges of the mounting bracket are located on ribs extending from the mounting bracket.

42. The viewing system of claim 40, wherein:
the mounting bracket includes a pair of hooks configured to extend into grooves in the button to connect the interior rearview mirror system to the button.

43. The viewing system of claim 40, wherein:
the ledges of the mounting bracket are located on spring clips extending from the mounting bracket.

44. The viewing system of claim 43, wherein:
the mounting bracket includes a mounting foot; and
the spring clips include shelves for snapping the spring clips onto the mounting foot.

45. The viewing system of claim 39, wherein:
the mounting bracket includes either a T-shaped member configured to be accepted in a T-shaped slot of the sensor or a T-shaped slot configured to accept a T-shaped member of the sensor.

46. The viewing system of claim 45, wherein:
the mounting bracket includes the T-shaped member.

47. The viewing system of claim 45, wherein:
the mounting bracket includes the T-shaped slot.

48. The viewing system of claim 38, further including:
a mounting bracket cover extending over the mounting bracket;
wherein the mounting bracket cover include facing ledges adapted to engage ledges of the sensor as the interior rearview mirror system is detached from the button, whereby the at least the portion of the sensor is no longer operatively coupled to the windshield as the interior rearview mirror system is detached from the button.

* * * * *

UNITED STATES PATENT AND TRADEMARK OFFICE
CERTIFICATE OF CORRECTION

PATENT NO. : 7,446,427 B2  
APPLICATION NO. : 10/848803  
DATED : November 4, 2008  
INVENTOR(S) : Brian R. Parker et al.

It is certified that error appears in the above-identified patent and that said Letters Patent is hereby corrected as shown below:

Col. 2, line 20;
"be-mg" should be -- being --.

Col. 2, line 24;
"mechanism-configured" should be -- mechanism configured --.

Col. 15, line 50;
"120h" should be -- 20h --.

Col. 18, line 33;
"6,670,270" should be -- 6,670,207 --.

Col. 25, claim 27, line 59;
"sensing-system" should be -- sensing system --.

Signed and Sealed this

Twenty-fourth Day of February, 2009

JOHN DOLL  
*Acting Director of the United States Patent and Trademark Office*